United States Patent
Pillman et al.

(10) Patent No.: US 7,911,505 B2
(45) Date of Patent: Mar. 22, 2011

(54) DETECTING ILLUMINANT FLICKER

(75) Inventors: Bruce H. Pillman, Rochester, NY (US); John F. Hamilton, Jr., Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 409 days.

(21) Appl. No.: 12/194,621

(22) Filed: Aug. 20, 2008

(65) Prior Publication Data

US 2010/0045819 A1    Feb. 25, 2010

(51) Int. Cl.
*H04N 9/73*    (2006.01)
*H04N 3/14*    (2006.01)
*H04N 5/335*    (2011.01)
*H04N 5/235*   (2006.01)

(52) U.S. Cl. .................. 348/226.1; 348/302; 348/222.1

(58) Field of Classification Search ............... 348/226.1, 348/910
See application file for complete search history.

(56) References Cited

U.S. PATENT DOCUMENTS

| | | | |
|---|---|---|---|
| 3,971,065 A | 7/1976 | Bayer | |
| 5,859,927 A | 1/1999 | Adams et al. | |
| 6,195,127 B1* | 2/2001 | Sugimoto | 348/370 |
| 6,441,856 B1* | 8/2002 | Sugimoto | 348/371 |
| 6,710,818 B1* | 3/2004 | Kasahara et al. | 348/607 |
| 6,850,278 B1* | 2/2005 | Sakurai et al. | 348/302 |
| 7,142,234 B2 | 11/2006 | Kaplinsky et al. | |
| 7,187,405 B2 | 3/2007 | Poplin et al. | |
| 7,298,401 B2* | 11/2007 | Baer | 348/226.1 |
| 7,656,436 B2* | 2/2010 | Kinoshita et al. | 348/226.1 |
| 2003/0030744 A1* | 2/2003 | Baer | 348/370 |
| 2004/0165084 A1* | 8/2004 | Yamamoto et al. | 348/226.1 |
| 2005/0046704 A1* | 3/2005 | Kinoshita | 348/226.1 |
| 2005/0264692 A1* | 12/2005 | Hoshino et al. | 348/452 |
| 2006/0055823 A1* | 3/2006 | Kinoshita et al. | 348/511 |
| 2007/0035707 A1* | 2/2007 | Margulis | 353/122 |
| 2007/0046790 A1* | 3/2007 | Nakasuji et al. | 348/226.1 |
| 2009/0167911 A1* | 7/2009 | Takane | 348/296 |

\* cited by examiner

*Primary Examiner* — Lin Ye
*Assistant Examiner* — Chia-Wei A Chen
(74) *Attorney, Agent, or Firm* — Raymond L. Owens

(57) ABSTRACT

A method of determining when an image capture device with a rolling shutter is in an environment having a flickering illuminant by using autocorrelation or frequency analysis of difference vectors produced from first and second captured images.

9 Claims, 23 Drawing Sheets

DETECTING ILLUMINANT FLICKER

FIELD OF THE INVENTION

The present invention relates to image processing using a digital sensor array and more particularly relates to determining when an image capture device operates in an environment having a flickering illuminant.

BACKGROUND OF THE INVENTION

Many image capture devices use solid-state image sensors containing a two-dimensional array of pixels. Increasingly, these image sensors are active pixel sensors (APS), also known as CMOS sensors, because they can be fabricated at high resolution using a Complementary Metal Oxide Semiconductor (CMOS) process.

In cameras and other types of image capture devices, CMOS image sensors often control exposure of each pixel by using an electronic rolling shutter, illustrated in the left hand portion of FIG. 1. In this figure, a two-dimensional pixel array 610 is read out a row of pixels at a time, indicated by the arrow labeled scan direction. This read out proceeds row by row with regular timing between the readout of one row and the readout of the next. For example, if a pixel array has 2000 rows and is read out in 30 milliseconds, the row time would be 15 microseconds. This time from the readout of one row to the readout of the next row is called the row time.

The exposure or integration time for each row of pixels is controlled electronically by resetting the row of pixels for a specific amount of time before the row is read out. The exposure time is denoted by $t_{exp}$, and is usually an integer multiple of the row time. Thus, FIG. 1 shows a row reset pointer 612 that is 10 rows ahead of a row readout pointer 614. In this case, $t_{exp}$ is 10 times the row time.

A consequence of rolling shutter exposure control is that while each row of the image can have an identical amount of exposure time, each row is exposed at a slightly different time. The rows at the top of the imager are exposed and read out before the rows at the bottom of the imager are exposed and read. The exposure time window that is alloted for each row of the imager moves later in time by the row time.

To the left of the graph of FIG. 1, time is shown in units of rows. The row time can be used to convert the time axis from row units to other units, such as milliseconds. For example, FIG. 1 illustrates an imager operating with a row time of 15.6 microseconds, so the time required to read 1600 rows is rounded off to about 25 milliseconds.

Flickering illuminants, such as fluorescent lights, provide an illumination that changes rapidly and periodically over time with cyclic power fluctuation. This flicker is illustrated in the right hand side graph of FIG. 1, showing relative illumination changing over time from about zero to full power (with relative illumination changing between 0.0 and 1.0) in a curve 616. In this example the illuminant power fluctuates with a period of about 8.33 milliseconds, or 1/120 second, such as would happen with a fluorescent light powered with line current having a 1/60 second period. Those skilled in the art will appreciate that an actual fluorescent light does not provide an illumination power that is precisely a rectified sinusoid like curve 16; however, this idealized example illustrates the illuminant flicker problem.

The interaction of the illuminant flicker and the rolling shutter readout timing results in bands of light and dark exposure in the image, depending on the value of exposure time $t_{exp}$ compared with the period of the illuminant flicker. For example, if exposure time $t_{exp}$ is equal to 1 row time, then the dark and light bands follow the illuminant curve very closely. Conversely, it is well known in the art that setting exposure time $t_{exp}$ to be one full period of the illuminant flicker eliminates the exposure bands completely, since each row of the image then integrates light from one full cycle of the illumination flicker.

FIG. 2A illustrates the magnitude of the exposure banding arising from illuminant flicker with different exposure times. In FIG. 2A, solid dark curve 616, the same curve as in FIG. 1, shows the relative illuminant power for an idealized fluorescent light. A rectangle 618 labeled Short illustrates the length of the exposure time used to produce the dotted curve 620 that cycles between about 0.4 and 0.9 times relative illumination. Because this short exposure time includes less than a full cycle of illuminant flicker, there is some amount of banding perceptible in the exposure at the image sensor. A rectangle 622 labeled Full Cycle in FIG. 2A illustrates the length of the exposure time used to produce a dashed curve 624 that is constant at approximately 0.64. This exposure exhibits no banding, because each row of the image sensor is exposed for one full cycle of the illuminant flicker. The rectangle 626 labeled Long illustrates a longer exposure time, used to generate the dashed-dotted curve 628 that cycles between 0.57 and 0.72. This longer exposure again has exposure bands, because each line is exposed for a time that is not an integer multiple of the flicker illumination period.

The graph of FIG. 2B shows relative banding as related to exposure time for 60 Hz fluctuation in light intensity. At very low exposure times, banding effects are most pronounced. At a small number of exposure times, depending on the frequency rate of the illuminant flicker, there is no banding or perceptible banding is very low. As exposure time increases beyond about 50 msec, banding is also reduced. The graph of FIG. 2C shows this relationship for 50 Hz fluctuation.

It is well known in the art that selecting an exposure time that is an integer multiple of the illumination flicker period helps to avoid exposure bands, as illustrated by curve 624 in FIG. 2A. For example, U.S. Pat. No. 7,142,234 B2 and U.S. Patent Application Publication No. 2005/0046704 A1 both teach how to avoid flicker when using rolling shutter readout, by selecting an exposure time than is an integer multiple of the period of illuminant flicker. Given that illuminant flicker is nearly always controlled by the frequency of alternating current (AC) electrical power in a geographic region, this usually simplifies to one of three cases: no illuminant flicker, 100 Hz flicker, or 120 Hz flicker. With an exposure control system that can eliminate the effects of illuminant flicker by controlling exposure time, the primary remaining problem is simply detecting the illuminant flicker and its frequency.

There are a number of conventional approaches for determining whether there is illuminant flicker and what frequency it has. For example, U.S. Pat. No. 7,142,234 to Kaplinsky et al., U.S. Pat. No. 7,187,405 to Poplin et al., and U.S. Pat. No. 6,710,818 to Kasahara et al. all teach methods for detecting illuminant flicker in a system that uses a rolling shutter. U.S. Pat. No. 7,142,234 uses a frequency analysis approach, computing a frame difference and checking for a peak signal at the expected frequency. Alternately, U.S. Pat. No. 7,187,405 discloses the approach of computing a difference between frames, then performing a frequency analysis or a cross-correlation between a difference vector and a sinusoid of the expected frequency. U.S. Pat. No. 6,710,818, meanwhile, discloses a technique of taking column vectors from adjacent frames, dividing one by the other, then performing a Discrete Fourier Transform (DFT) analysis on the ratio that is obtained. U.S. Pat. No. 6,710,818 also discloses various filtering techniques for smoothing the ratio vector to improve detection reliability.

Conventional approaches such as those just cited have several limitations. In practice, frame differences provide a poor indication of variation in exposure, particularly when these values are applied to linear image sensor data and the task of acquiring frame difference data can be computationally costly. Ratios of linear data provide a more sensitive result, but computational division is also relatively expensive in terms of the needed processing resources and time.

Frequency analysis methods are relatively computationally expensive in that a vector is projected onto one or more basis functions, requiring storage and processing capacity to provide these basis functions. Further, frequency analysis works effectively with exposure bands that project cleanly onto one or more basis functions. When a non-integer number of flicker cycles are included in a frame, the discontinuity from one frame to the next can corrupt the frequency response results.

Earlier methods for detecting and compensating for illuminant banding all have limitations, and there is a need for flicker detection with improved reliability and efficiency. There is, then, a need for a technique that is sensitive to exposure variation and is less demanding of computing resources.

SUMMARY OF THE INVENTION

It is an object of the present invention to determine when an image capture device with a rolling shutter is in a flickering illuminant environment. This object is achieved in a method of determining when an image capture device with a rolling shutter is in an environment having a flickering illuminant, comprising:

(a) storing rows of pixels from a first captured digital image in memory;

(b) using the rows of pixels to provide a first column vector;

(c) providing a first order difference vector from the first column vector; and clipping the elements in the first order difference vector and reconstructing those clipped elements into a first modified column vector;

(d) storing rows of pixels from a second captured digital image in memory;

(e) using the rows of pixels to provide a second column vector;

(f) providing a first order difference vector from the second column vector; and clipping the elements in the first order difference vector and reconstructing those clipped elements into a second modified column vector;

(g) subtracting the first modified column vector from the second modified column vector to provide a refined difference vector; and (h) computing autocorrelations of the refined difference vector at specified lag(s) and using the autocorrelations to determine when an image capture device with a rolling shutter is in an environment having a flickering illuminant.

This object is further achieved in a method of determining when an image capture device with a rolling shutter is in an environment having a flickering illuminant, comprising:

(a) storing rows of pixels from a first captured digital image in memory;

(b) converting each pixel of each row into a logarithmic digital representation providing a converted digital image and using the rows of the converted digital image to provide a first column vector;

(c) providing a first order difference vector from the first column vector; and clipping the elements in first order difference vector and reconstructing those clipped elements into a first modified column vector;

(d) storing rows of pixels from a second captured digital image in memory;

(e) converting each pixel of each row into a logarithmic digital representation providing a converted digital image and using the rows of the converted digital image to provide a second column vector;

(f) providing a first order difference vector from the second column vector; and clipping the elements in first order difference vector and reconstructing those clipped elements into a second modified column vector;

(g) subtracting the first modified column vector from the second modified column vector to provide a refined difference vector; and (f) computing autocorrelations of the refined difference vector at specified lag(s) and using the autocorrelations to determine when an image capture device with a rolling shutter is in an environment having a flickering illuminant.

This object is still further achieved in a method of determining when an image capture device with a rolling shutter is in an environment having a flickering illuminant, comprising:

(a) storing rows of pixels from a first captured digital image in memory;

(b) converting each pixel of each row into a logarithmic digital representation providing a converted digital image and using the rows of the converted digital image to provide a first column vector;

(c) providing a first order difference vector from the first column vector; and clipping the elements in first order difference vector and reconstructing those clipped elements into a first modified column vector;

(d) storing rows of pixels from a second captured digital image in memory;

(e) converting each pixel of each row into a logarithmic digital representation providing a converted digital image and using the rows of the converted digital image to provide a second column vector;

(f) providing a first order difference vector from the second column vector; and clipping the elements in first order difference vector and reconstructing those clipped elements into a second modified column vector;

(g) subtracting the first modified column vector from the second modified column vector to provide a refined difference vector; and (h) computing using frequency analysis on the refined difference vector to determine when an image capture device with a rolling shutter is in an environment having a flickering illuminant.

Advantages of the present invention include improved ability to identify illuminant flicker under difficult conditions, such as when scene content has high dynamic range and has scene content masking the illuminant banding. It also makes efficient use of processing resources. Using autocorrelation is well adapted to handle situations where the exposure bands are periodic but not precisely sinusoidal.

DETAILED DESCRIPTION

Figure 3:
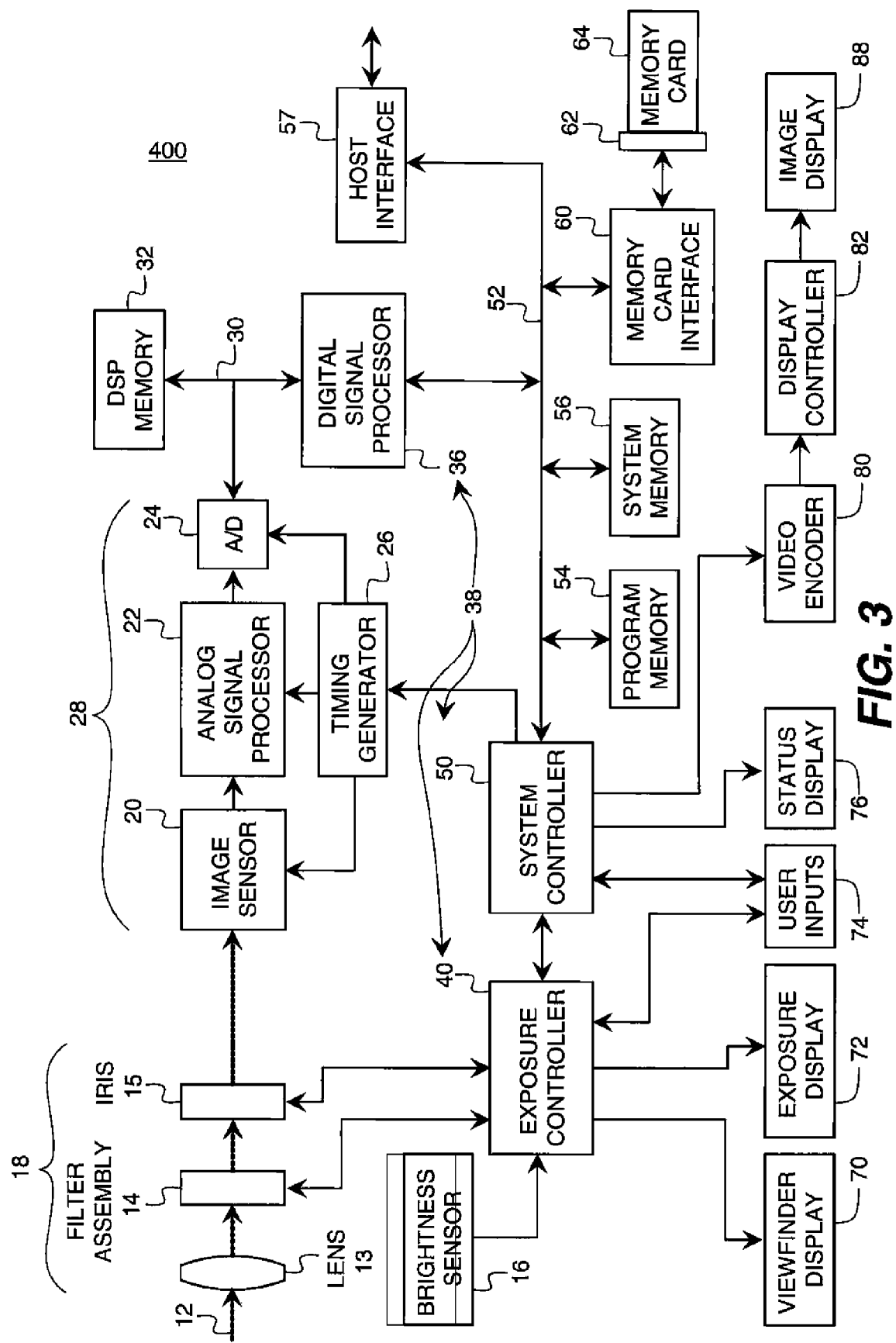
FIG. 3 is a schematic block diagram of an image capture device in the form of a digital camera.

FIG. 3 shows a block diagram of an image capture device 400 functioning as a digital camera embodying the present invention. Although a digital camera will now be explained, the present invention is clearly applicable to other types of image capture devices. In the disclosed camera, light 12 from the subject scene is input to an imaging stage 18, where a lens 13 focuses the light to form an image on a solid-state image sensor 20. Image sensor 20 converts the incident light to an electrical signal for each picture element (pixel). The image sensor 20 of the preferred embodiment is an active pixel sensor (APS) type (APS devices are often referred to as CMOS sensors because of the ability to fabricate them in a Complementary Metal Oxide Semiconductor process). Other types of image sensors having two-dimensional array of pixels are used provided that they employ rolling shutter exposure control. The present invention also makes use of the image sensor 20 having a two-dimensional array of pixels that can be divided into groups that are sensitive to different wavelength bands. An iris block 15 and the filter block 14 regulate the amount of light reaching the image sensor 20. The iris block 15 varies the aperture and a filter block 14 includes one or more ND filters interposed in the optical path. An exposure controller block 40 responds to the amount of light available in the scene as metered by a brightness sensor block 16 and controls both of these regulating functions as well as electronic exposure control. Electronic exposure control is accomplished through a system controller 50 and a timing generator 26 controlling rolling shutter exposure timing on the image sensor 20.

This description of a particular camera configuration will be familiar to one skilled in the art, and it will be obvious that many variations and additional features are present. For example, an autofocus system is added, or the lenses are detachable and interchangeable. It will be understood that the present invention is applied to any type of digital camera, where similar functionality is provided by alternative components. The present invention can also be practiced on imaging components included in non-camera devices such as mobile phones and automotive vehicles.

The analog signal from image sensor 20 is processed by an analog signal processor 22 and applied to an analog to digital (A/D) converter 24. The timing generator 26 produces various clocking signals to select rows and pixels and synchronizes the operation of analog signal processor 22 and A/D converter 24. An image sensor stage 28 includes the image sensor 20, the analog signal processor 22, the A/D converter 24, and the timing generator 26. The components of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with a digital signal processor (DSP) 36. The read out operation (such as "read out image from sensor") is understood to refer to the steps described here, producing digital pixel values stored in memory.

Digital signal processor 36 is one of three processors or controllers in this embodiment, in addition to the system controller 50 and exposure controller 40. Although this partitioning of camera functional control among multiple controllers and processors is typical, these controllers or processors are combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term controller will be used as needed to encompass all of this functionality within one phrase, for example, as in a controller 38 in FIG. 3.

In the illustrated embodiment, DSP 36 manipulates the digital image data in its memory 32 according to a software program permanently stored in program memory 54 and copied to memory 32 for execution during image capture. Controller 38 executes the software necessary for practicing image processing shown in FIG. 4. Memory 32 includes of any type of random access memory, such as SDRAM. A bus 30 includes a pathway for address and data signals. The bus 30 connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 13, ND filter 14 and iris 15, as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on an image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into a memory card socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by a display controller 82 and presented on image display 88. This display is typically an active matrix color liquid crystal display (LCD), although other types of displays are used as well.

The user interface, including all or any combination of a viewfinder display 70, an exposure display 72, a status display 76 and image display 88, and user inputs 74, is controlled by a combination of software programs executed on exposure controller 40 and system controller 50. The user inputs 74 typically include some combination of buttons, rocker switches, joysticks, rotary dials, or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs 74 selecting exposure mode, lens aperture, exposure time (shutter speed), and exposure index or ISO speed rating and directs the lens and other elements accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The foregoing description of a digital camera is familiar to one skilled in the art. Clearly, there are many variations of this embodiment that can be selected to reduce the cost, add features, or improve the performance of the camera. The following description discloses in detail the operation of this camera for capturing images according to the present invention. Although this description is with reference to a digital camera, it is understood that the present invention applies for use with any type of image capture device having an image sensor with either or both color and panchromatic pixels.

Image sensor 20 shown in FIG. 3 typically includes a two-dimensional array of light sensitive pixels fabricated on a silicon substrate that provide a way of converting incoming light at each pixel into an electrical signal that is measured. As image sensor 20 is exposed to light, free electrons are generated and captured within the electronic structure at each pixel. Capturing these free electrons for some period of time and then measuring the number of electrons captured, or measuring the rate at which free electrons are generated can measure the light level at each pixel. In the former case, accumulated charge is transferred to a charge to voltage measurement circuit as in an active pixel sensor (APS or CMOS sensor).

Whenever general reference is made to an image sensor in the following description, it is understood to be representative of image sensor 20 from FIG. 3. It is further understood that all examples and their equivalents of image sensor architectures and pixel patterns of the present invention disclosed in this specification is used for image sensor 20.

In the context of an image sensor, a pixel (a contraction of "picture element") refers to a discrete light sensing area and charge transfer or charge measurement circuitry associated with the light sensing area. In the context of a digital color image, the term pixel commonly refers to a particular location in the image having associated color values.

Flicker Detection and Response

Figure 4:
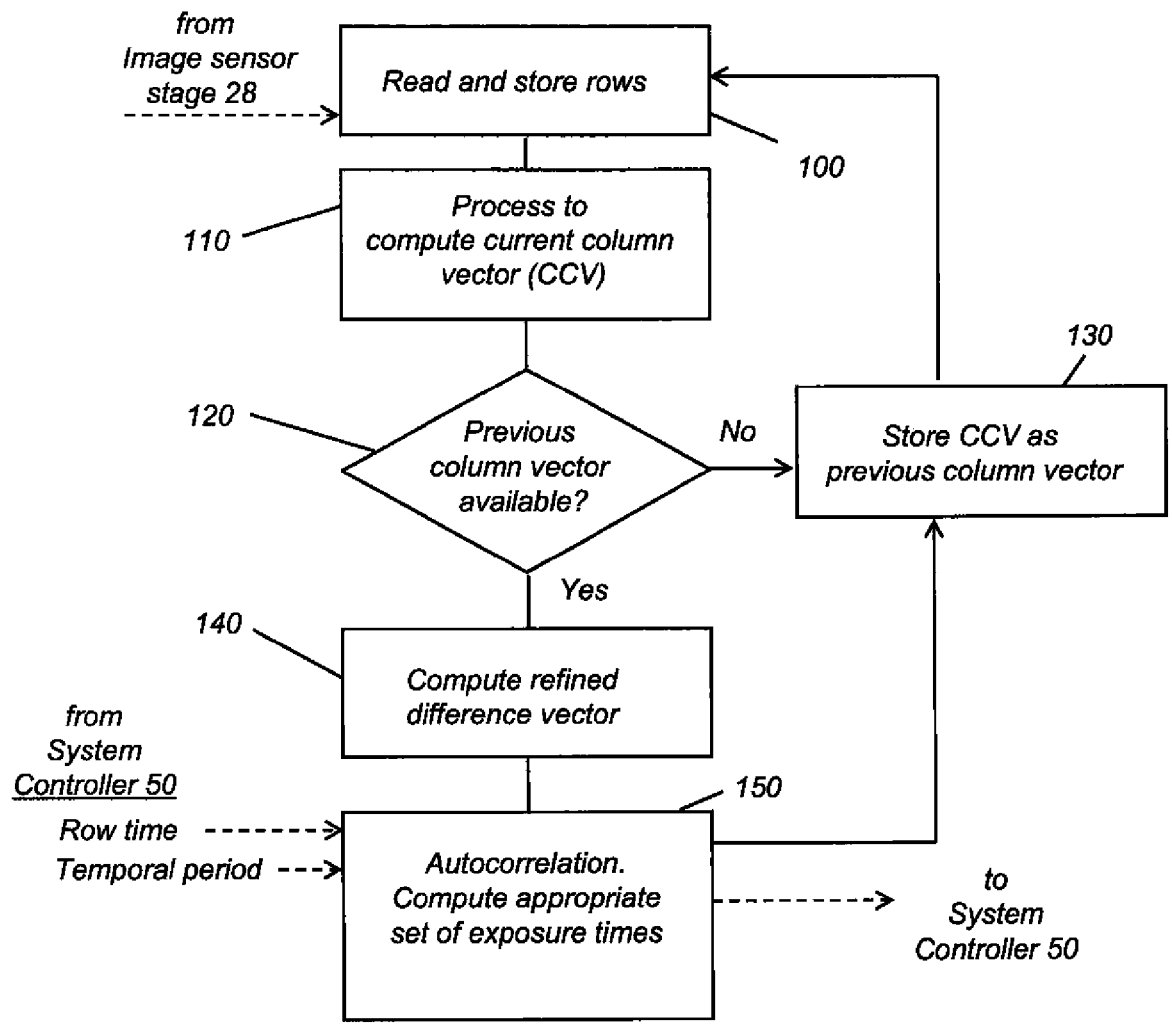
FIG. 4 is a flow diagram of a preferred embodiment of the present invention.

Embodiments of the present invention process image data for successive images in order to detect flicker, so that appropriate steps for flicker compensation can be performed. FIG. 4 is a flow diagram of an embodiment of the present invention used to detect and adapt for flicker with the digital camera or other image capture device 400 of FIG. 3. In this embodiment, system controller 50 uses an initial exposure time in order to capture an image. In a read step 100, image data obtained from image sensor stage 28 or DSP memory 32 is read, row-by-row. A processing step 110 then computes a current column vector (CCV) having a value for each row or group of rows. Processing step 110 can have a number of variations in the processing performed, including different types of data conversion for simplifying calculation, as described in more detail subsequently. A decision step 120 then checks for an existing previous column vector. If none exists, the CCV is stored as previous column vector in a storage step 130 and processing of the next image begins. If a previous column vector exists, processing continues to a computation step 140 that computes a refined difference vector using a combination of values from the current column vector and the previous column vector. In one embodiment, for example, subtraction between previous and current column vectors is performed. An exposure computation step 150 then computes an appropriate set of exposure times based on the output of step 140 and provides an adjusted value for exposure time to system controller 50. As a result of this processing, the exposure time can be modified by system controller 50 to adjust camera operation and eliminate flicker effects.

A reflecting object reflects a certain percentage of its incident illumination. For a flat white object, this is roughly 90% of its incident illumination; a flat gray object reflects roughly 20% of its incident illumination, and so forth. Significantly, when the illumination level varies, each object consistently reflects a constant percentage of its incident illumination.

Figure 1:
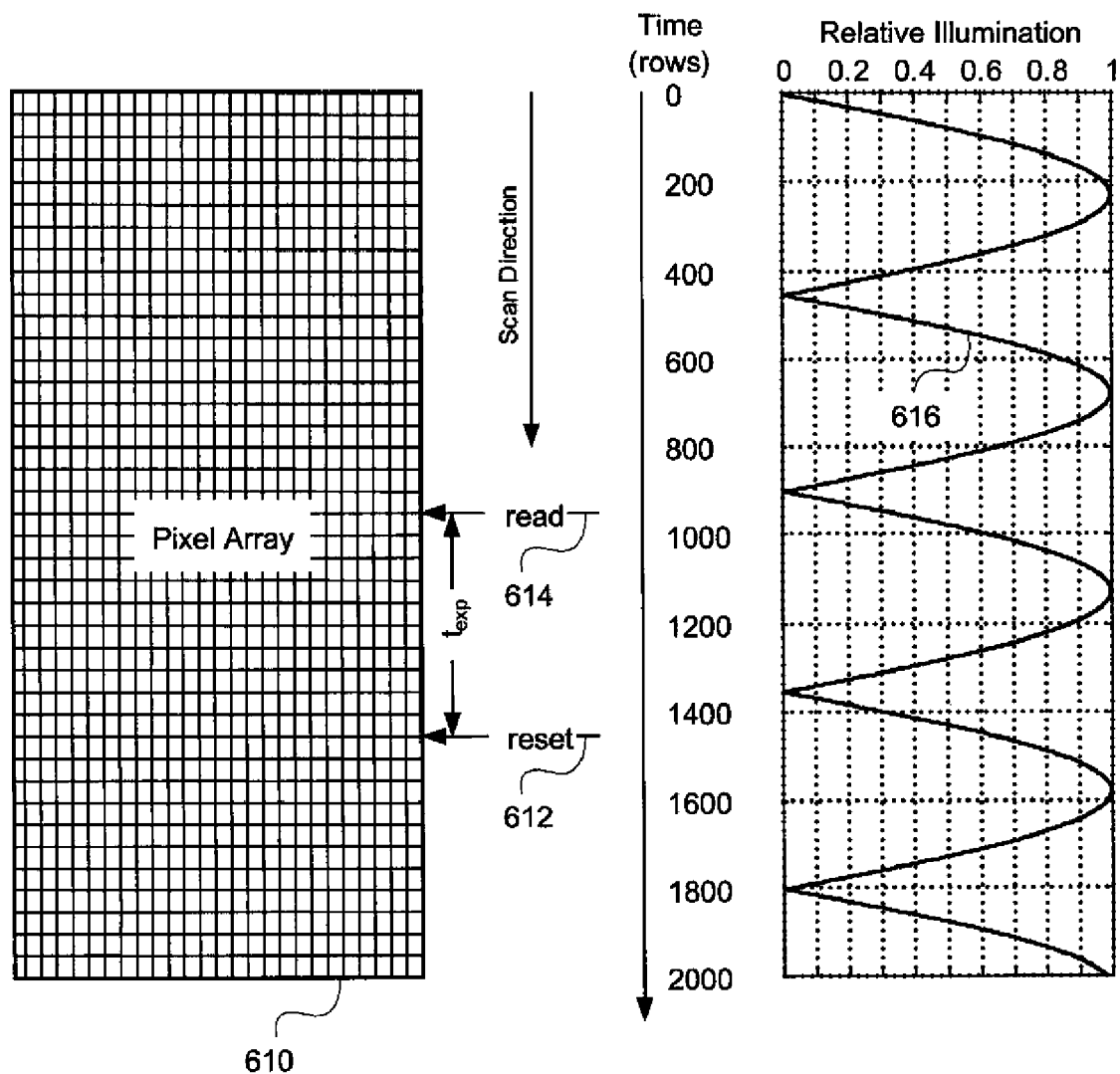
FIG. 1 is a prior art illustration of a rolling shutter image sensor and a flickering illuminant.
Figure 2A:
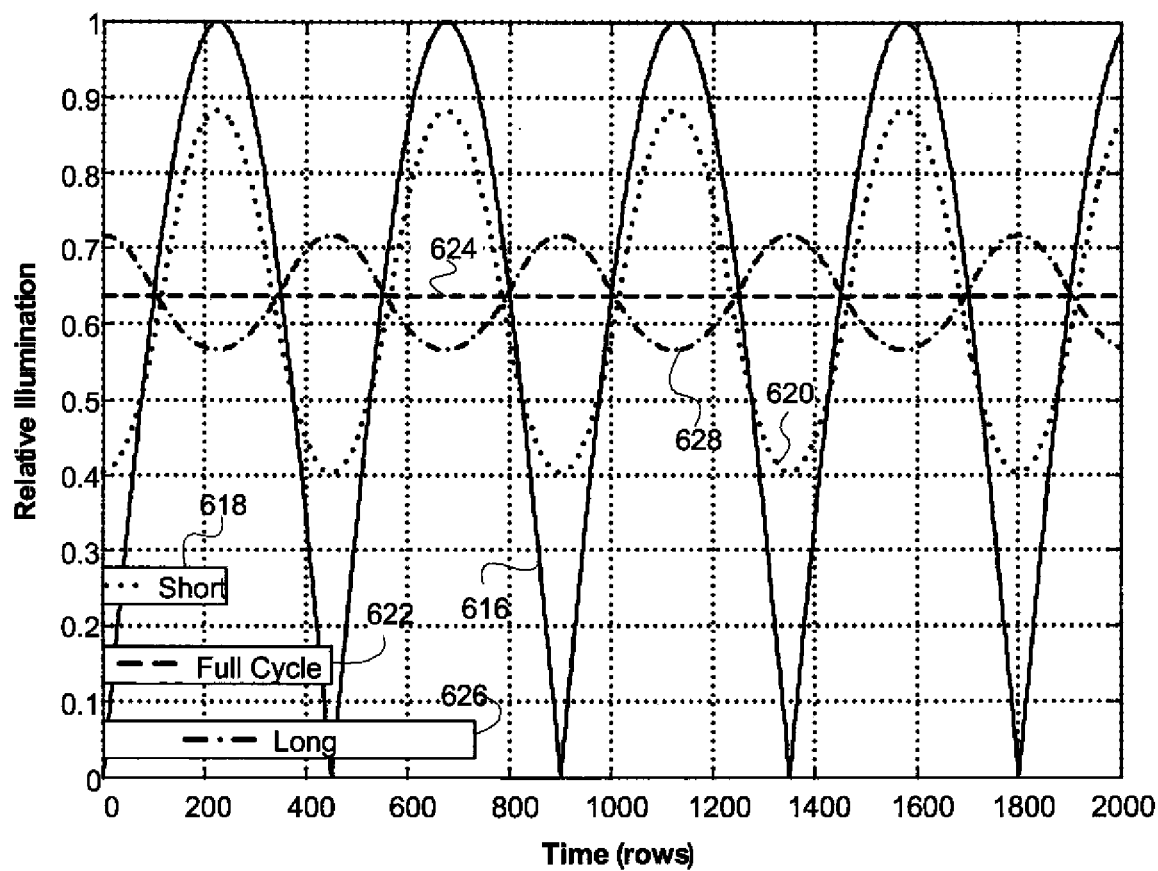
FIG. 2A is a prior art graph showing relative exposure banding magnitudes in a rolling shutter image sensor with a flickering illuminant.

Considering the exposure bands of curve 628 in FIG. 2A, it is common for exposure bands to produce a modulation of approximately 20 percent in a scene, regardless of scene content. Thus, for example, when a portion of a scene contains a flat white region with mean exposure near full scale, the digital values that are read out will then vary from roughly full scale (100%) down to 80% of full scale with flickering illuminant. Similarly, when the same varying illuminant falls on a flat gray region with mean exposure near 20% of full scale, the digital values that are read out vary from 20% of full scale down to about 16% of full scale.

One difficulty that is significant for flicker detection relates to differentiating flicker effects from scene content in the image. This can be particularly challenging when the scene content itself is in linear form, with the modulation of the exposure bands masked by the varying scene content.

Using a nonlinear transformation that converts constant percentage exposure modulation to a constant code value modulation can help to mitigate this masking. In one embodiment, processing step 110 applies a non-linear transform to the row data used for the current column vector for this reason.

Figure 5:
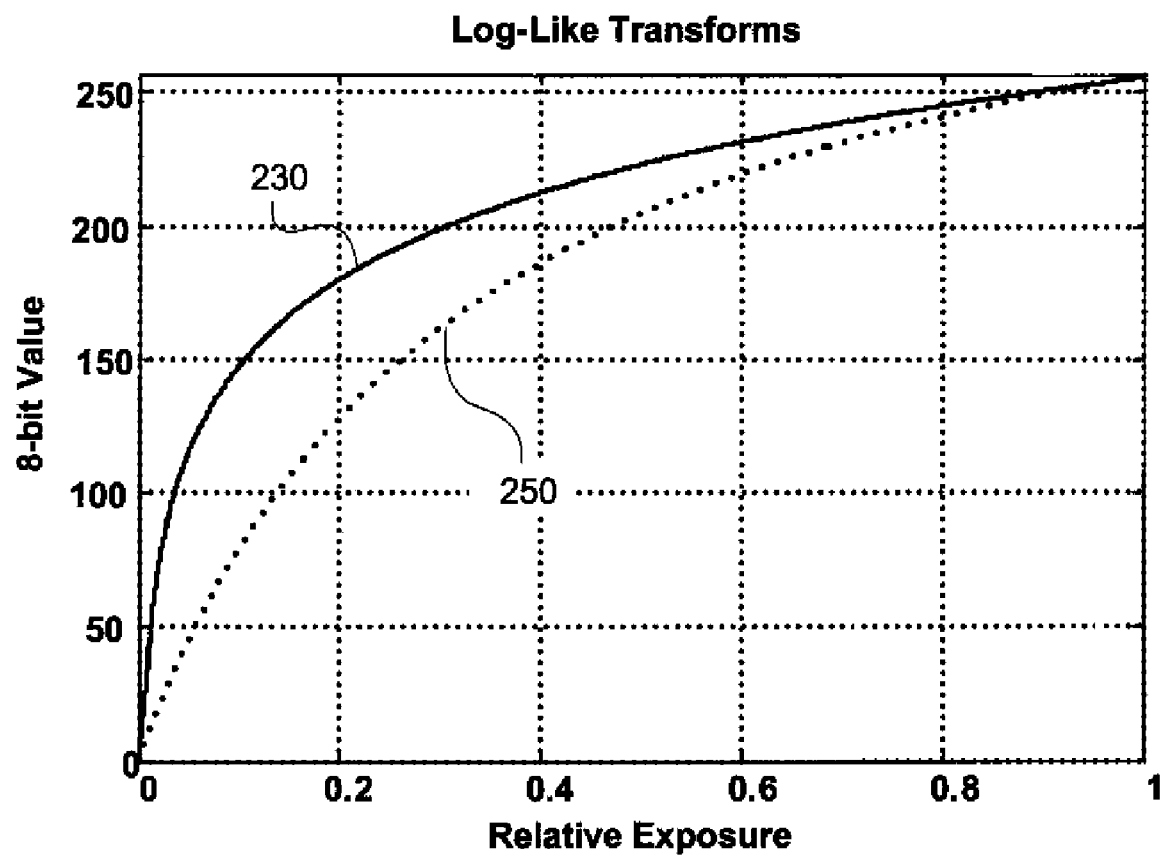
FIG. 5 is a plot of two log-like nonlinear transformations.
Figure 6:
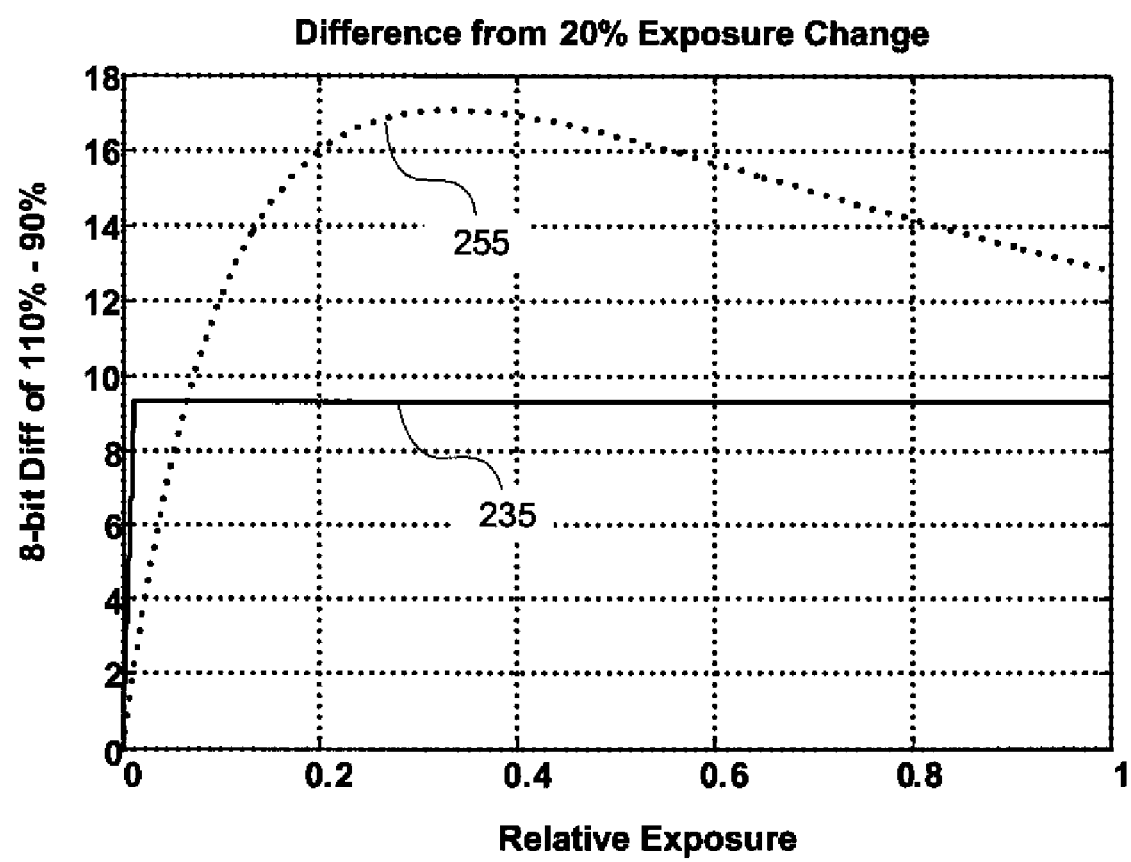
FIG. 6 is a plot of an exposure difference mapped through the log-like transformations in FIG. 5.

It has been found that a log transform provides one type of particularly useful transformation for differentiating scene content from flicker in the image data. A log-like transformation is illustrated by a curve 230 in FIG. 5. Above a certain relative exposure level (about 0.02 relative exposure), this curve has a slope that is a constant fraction of the mean value. Because this curve has a slope that is a constant percentage of mean value, the code value difference (in 8-bit values) that arises from a fixed percentage exposure change is essentially constant. This is shown in the graph of FIG. 6, where curve 235, the code value difference caused by a 20% change in relative exposure, is constant above a certain relative exposure level. The precise definition of this curve is described in more detail in commonly assigned U.S. Pat. No. 5,859,927A entitled "Method and system for the reduction of memory capacity required for a digital representation of an image" to Adams et al.

While a function like curve 230 is quite attractive for converting constant percentage changes to a constant code value difference, this function may not be very convenient to compute in some environments. It can easily be implemented as a lookup table, but this requires memory for the table. This function can also be approximated by standard numerical routines, such as are used in scientific subroutine libraries. However, this also takes space and significant computing resources as well. There is a need for an approximate form of this function that is very compact and allows straightforward computation for hardware implementations. A particularly compact approximation to this function is shown by curve 250, indicated by a dotted line, in FIG. 5. Curve 250 is computed using equation (1).

$$y = \frac{272x + \frac{x+272}{2}}{x+272} \quad (1)$$

The difference in 8-bit values from this curve that results from a constant 20% change in relative exposure is shown in curve 255 of FIG. 6. As can be seen here, the difference in code value resulting from a 20% exposure change is not constant, but changes by less than a factor of two over most of the exposure range, providing a relatively even change with an extremely compact numerical form.

Figure 7A:
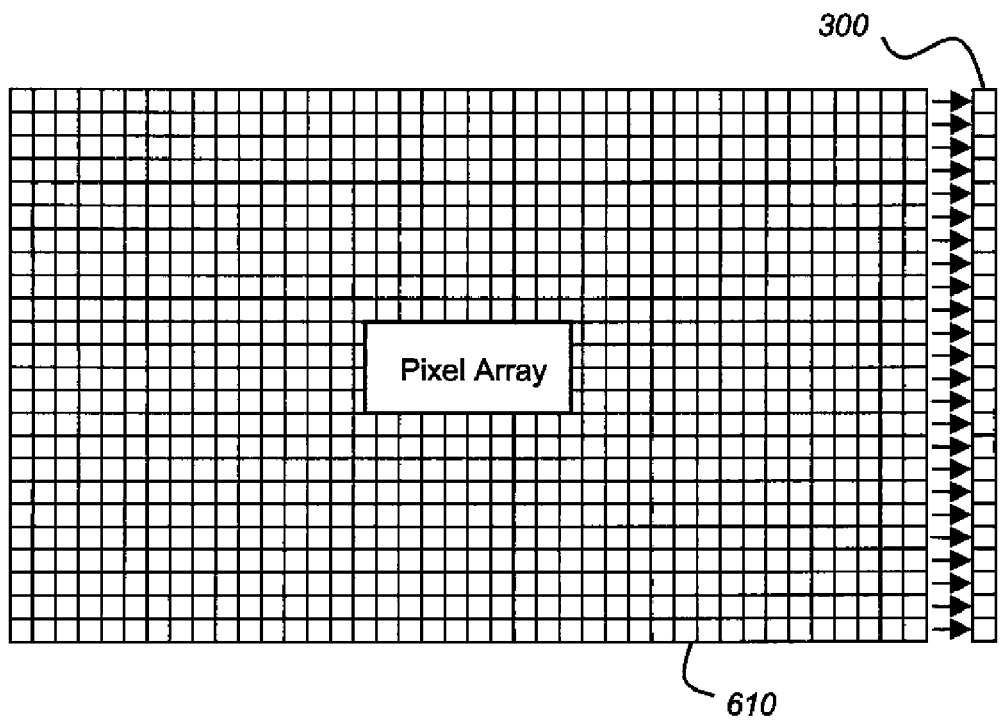
FIGS. 7A and 7B illustrate summing of rows of pixels into a column vector.

Returning to FIG. 4, processing step 110 prepares a first column vector from rows of pixel data. The simplest embodiment of this preparatory step is illustrated in FIG. 7A, summing pixels in each row of the pixel array 610 to an element of column vector 300. This sum is then scaled by an appropriate value to bring the column vector to an appropriate data range. For example, 2048 pixels on a row are summed, and the sum is scaled by $\frac{1}{512}$ in order to provide a column vector entry that has two fractional bits of precision. The entire row of pixels can be summed to form each column vector value; alternately, a partial subset of the pixels within the row can be summed together. Depending in the size of pixel array 610, the subset is conveniently selected as a central window portion that has a size that is a suitable power of 2. For example, if the pixel array is 2200 pixels wide, the central 2048 pixels ($2^{11}$=2048) can be summed. This has the advantage of simplifying the hardware implementation, limiting the number bits required for the sum before scaling, for example.

Figure 7B:
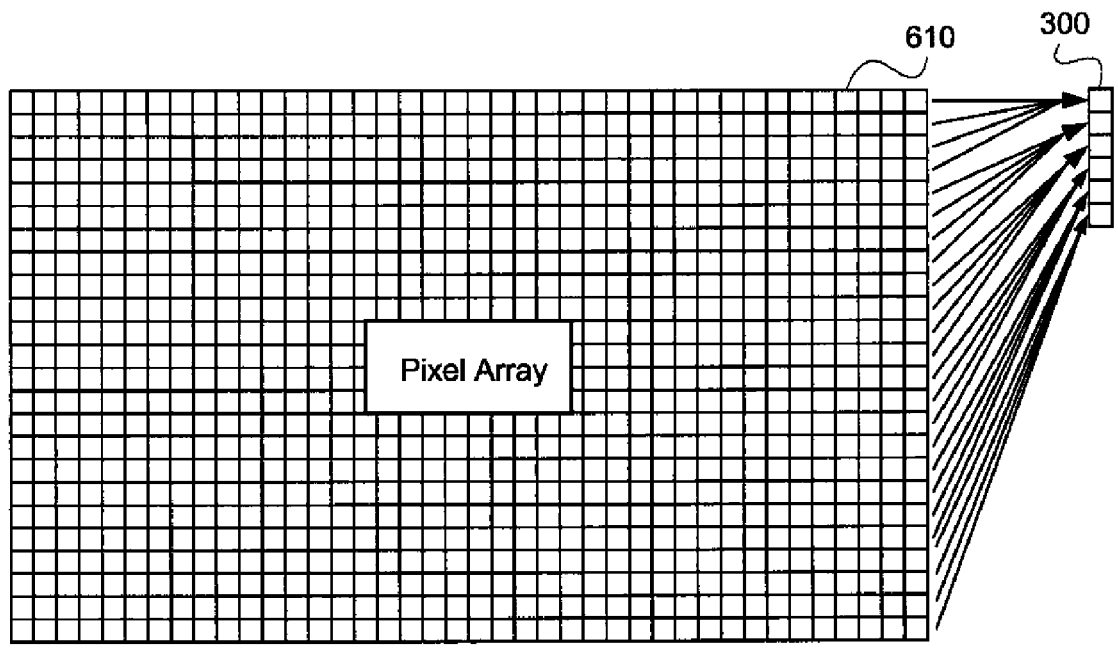

Depending on the number of rows in the pixel array, column vector 300 as illustrated in FIG. 7A is longer than needed for flicker detection. The time required for reading out pixel array 610 is usually between 30 and 60 milliseconds, though times can range from 8 milliseconds to 500 milliseconds. This time typically includes 3.6 to 11 cycles of illuminant flicker, although this range can extend from 1 to 60 cycles. A 2000 element column vector would thus usually have several hundred data points per cycle, more than is needed to detect flicker. In one embodiment, an integer number of rows from pixel array 610 are summed to form each element in column vector 300, as illustrated in FIG. 7B. Again, the column vector is scaled after the summation, in order to keep data in an appropriate range. The number of rows included in each element of column vector 300 is selected to assure that column vector 300 has a suitable number of elements, preferably between 10 elements and 100 elements per illuminant flicker cycle.

Figure 7C:
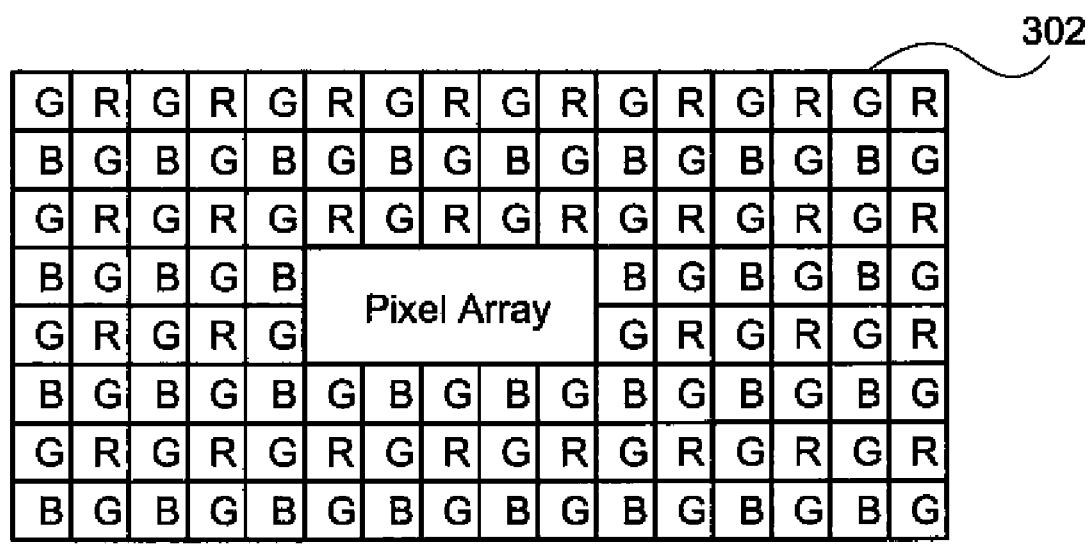
FIG. 7C shows a pattern of color filters in one embodiment.

In order to produce a color image, the array of pixels in an image sensor typically has a pattern of color filters placed over them. FIG. 7C shows a filter array 302, arranged with a pattern of red, green, and blue color filters. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. Because of the alternating row pattern in the CFA, it is preferred to sum an even number of rows for each element in the column vector. Other CFA patterns are also used with the present invention; the preferred embodiment sums groups of rows to provide consistency in each element of the column vector 300.

Processing and Computation Example 1

A first example given in the graphs of FIGS. 8A through 8F shows the operation of processing step 110 and computation step 140 in the logic flow of FIG. 4. Referring back to the logic flow diagrams of FIG. 4, processing step 110 provides a current column vector (CCV). Step 110 begins by obtaining a column vector, and then performs some amount of additional processing that generates a modified column vector that serves as the current column vector CCV.

For the logic flow shown in FIG. 4, two frames are used, labeled Frames 1 and 2 in the example of FIGS. 8A through 8F. The first part of the following description, focusing on processing step 110, obtains and processes Frames 1 and 2 to generate their corresponding modified column vectors. The processing in computation step 140 uses the two modified column vectors to generate a refined difference vector used for subsequent autocorrelation.

Step 110 processes the original column vector 300 that is obtained as described earlier with reference to FIGS. 7A and 7B and includes a number of sub-steps, including at least the following:

(i) computing a first-order difference between adjacent elements of the column vector, thereby generating a first order difference vector;

(ii) clipping the difference values to within a predetermined range of values within which flickering illuminant effects are detectable, creating a modified first order difference vector, then reconstructing a modified column vector.

Figure 8A:
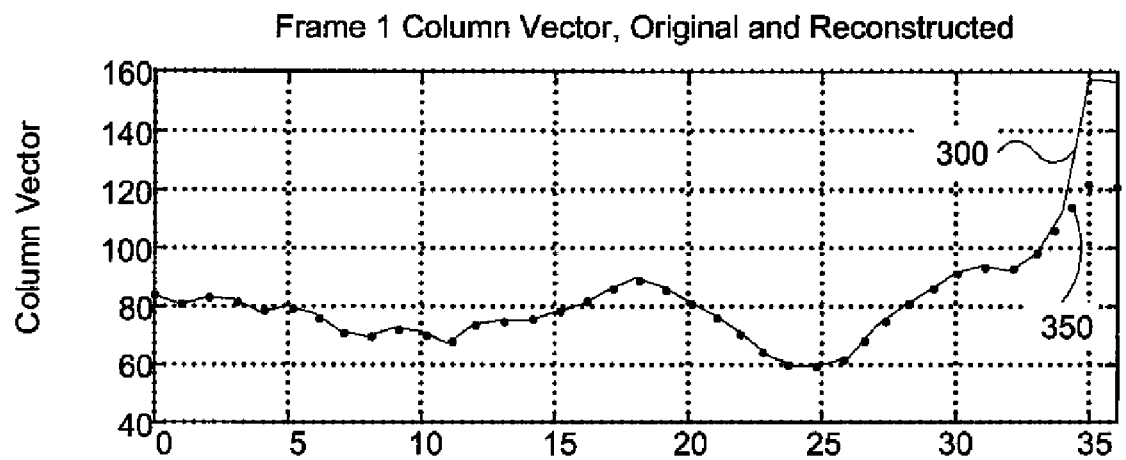
FIGS. 8A and 8B illustrate delta clipping of a column vector.
Figure 8B:
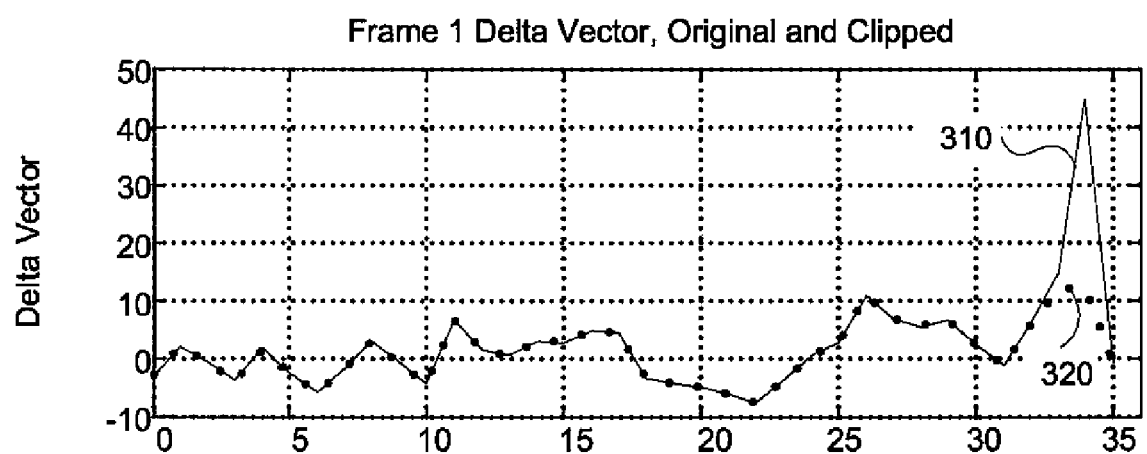

The operation of processing step 110 for one frame of a captured image is illustrated by way of example in FIGS. 8A and 8B. The curve labeled 300 in FIG. 8A shows the corresponding values in column vector 300. FIG. 8B, greatly magnified in scale in the vertical direction, gives a plot of first order difference vector 310, as a curve labeled 310. A clipping process, as shown in FIG. 8B, helps to reject sudden changes in the difference vector. Clipping is shown at a modified first order difference vector curve 320.

Sudden changes in the first order difference vector are most often indicative of image scene content. Since illuminant flicker produces slowly varying exposure bands, abrupt and pronounced changes between one column vector value and the next are not a result of illuminant flicker. Thus, any abrupt change is most likely to represent actual scene content rather than exposure band anomalies. As shown by the scale of FIG. 8B and curve 320, after clipping, the values of the first order difference vector are within a small range of values, between about −8 and +12 in the example shown. By clipping values in the first order difference vector 310 to generate curve 320, difference values now lie within a limited numerical range. Thus, this processing thus offers potential memory savings. Referring back to FIG. 8A, the modified first order difference vector is used to form a modified column vector 350, as shown by curve 350.

Depending on implementation in a particular embodiment, modified column vector 350 is stored as a vector of values (FIG. 8A) or as a vector of first order differences (FIG. 8B) so that the column vector values can be reconstructed when needed for processing. This description that follows discusses column vectors and further processing without specifying the detailed storage mechanism used for this purpose.

Referring again back to the logic flow shown in FIG. 4, after the first modified column vector 350 is computed, it is stored in the current column vector in storage step 130. In the first iteration of the processing shown in the flow diagram of FIG. 4, for the first of two image frames that are used for this analysis, this is a first modified column vector. In the first iteration through this loop, computation step 140 and processing step 150 are not yet performed, since they require access to a previous column vector. The current column vector that is stored in storage step 130 is available for subsequent processing in computation step 140 and processing step 150.

Figure 8C:
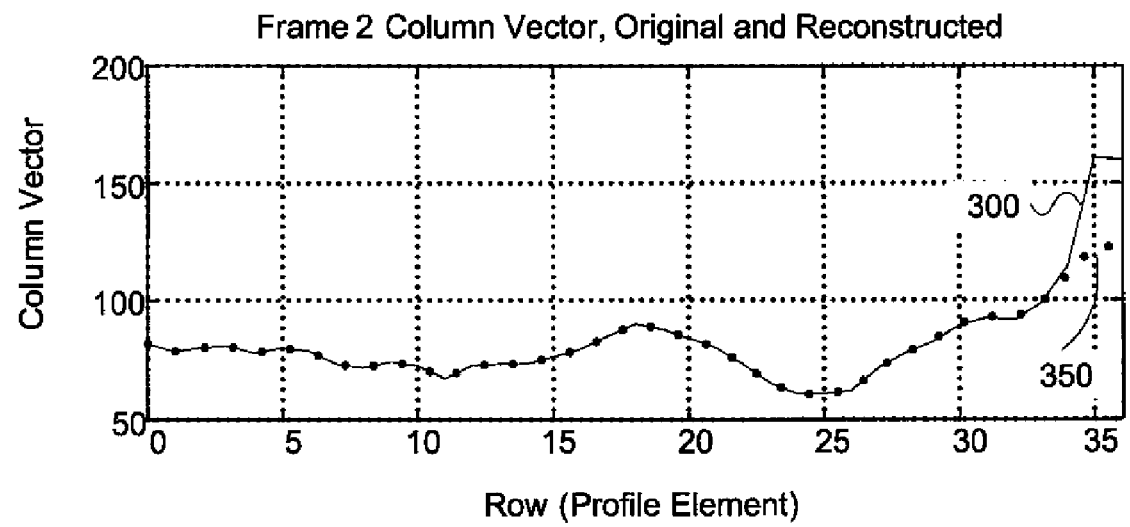
FIGS. 8C and 8D illustrate delta clipping of a column vector.
Figure 8D:
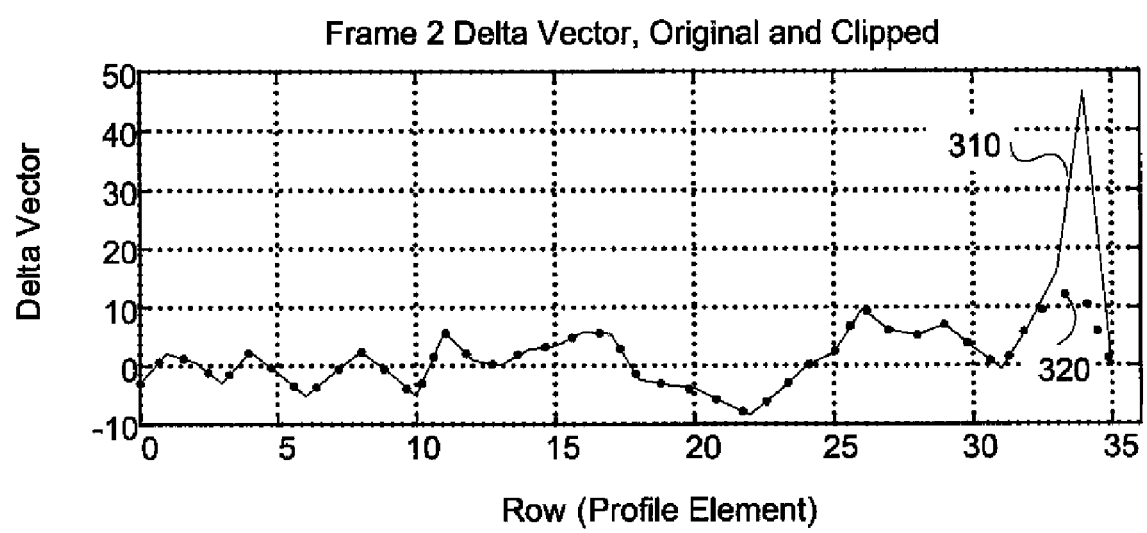

FIGS. 8C and 8D show the corresponding steps taken in processing step 110 for obtaining a second modified column vector from the subsequent frame (Frame 2). FIG. 8C shows the original column vector data for the second frame. Once again, a first order difference vector is computed and clipped, shown as first order difference vector 310 and modified first order difference vector 320 in FIG. 8D. This again forms modified column vector 350, as shown in FIG. 8C.

Figure 8E:
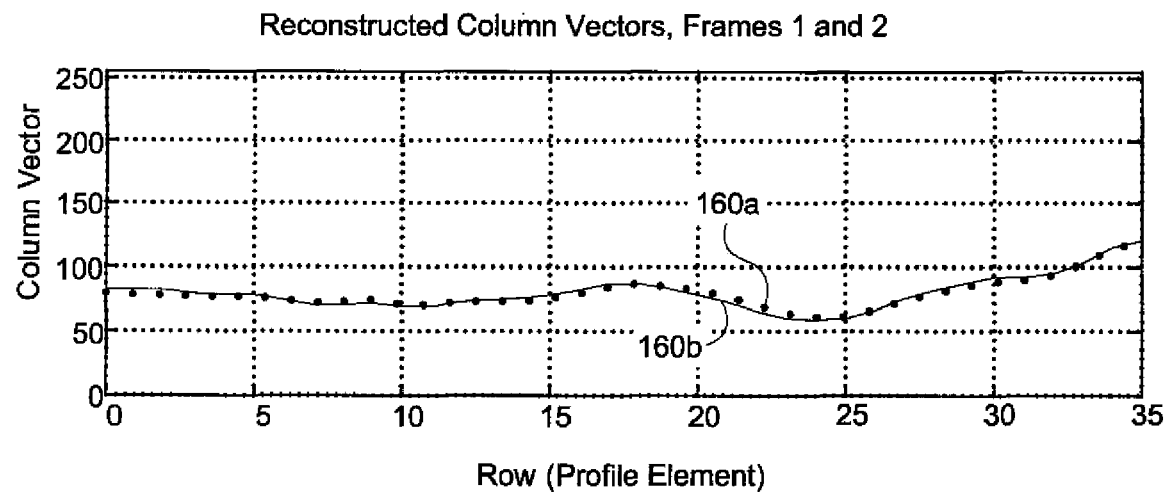
FIGS. 8E and 8F illustrate an exposure banding signal computed from frame differences.
Figure 8F:
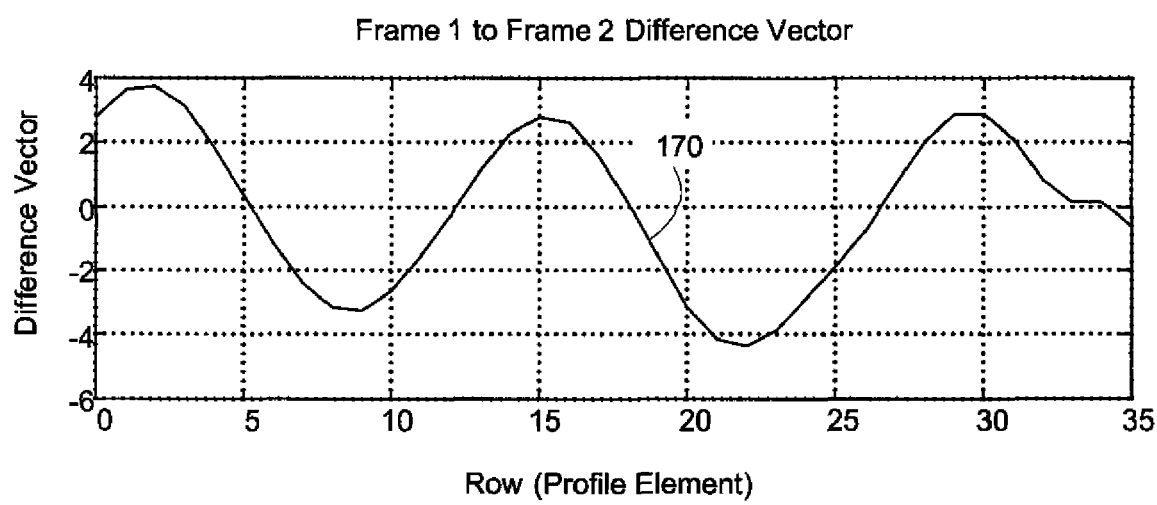
Figure 9:
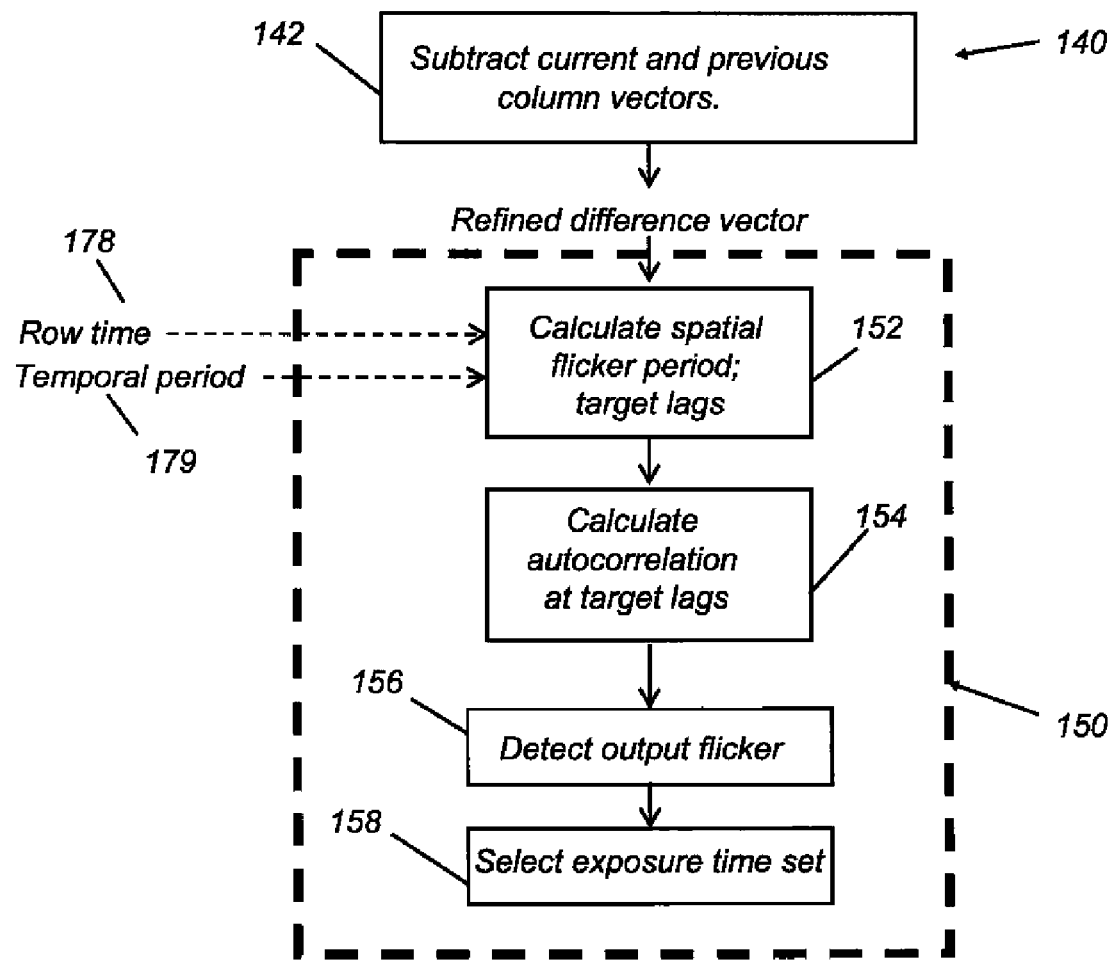
FIG. 9 is a logic flow diagram showing more detailed processing used to detect and compensate for illuminant flicker.

With first and second modified column vectors now generated in the step 110 processing described with reference to FIGS. 8A through 8D, computation step 140 can now be executed in order to calculate a refined difference vector 170, from modified column vectors 160a and 160b, as shown in the example curves of FIGS. 8E and 8F. FIG. 9 expands upon the processes of computation step 140 and processing step 150 from FIG. 4 to describe how refined difference vector 170 is formed and flicker detection is completed in one embodiment.

Referring now to FIG. 9, in computation step 140, a subtraction step 142 subtracts the current and previous modified column vectors to obtain a refined difference vector as output. This output then goes to processing step 150, along with row time and temporal period data, as noted earlier. A calculation step 152 calculates the desired spatial flicker period and target lags or offsets. A second calculation step 154 then calculates the autocorrelation for the target lags or offsets. An output flicker detection step 156 then provides results of output flicker detection to a processing step 158 that selects the exposure time. Referring back to FIG. 8E, curves for modified column vectors 160a and 160b are shown. FIG. 8F then shows, at greatly magnified scale in the vertical direction, the corresponding curve for refined difference vector 170. In this example, difference vector 170 would appear to indicate the presence of illuminant flicker, based on its generally sinusoidal shape.

Figure 10A:
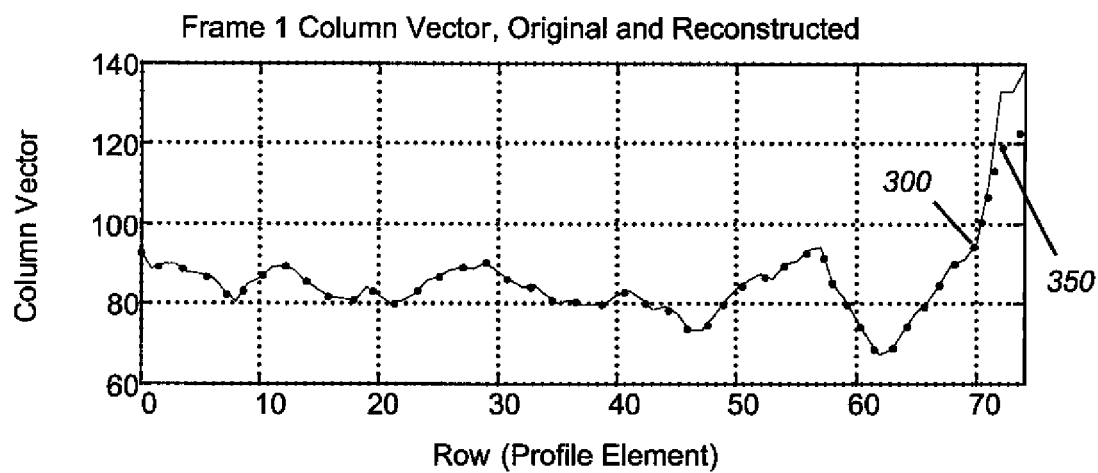
FIGS. 10A and 10B illustrate delta clipping of a column vector.
Figure 10B:
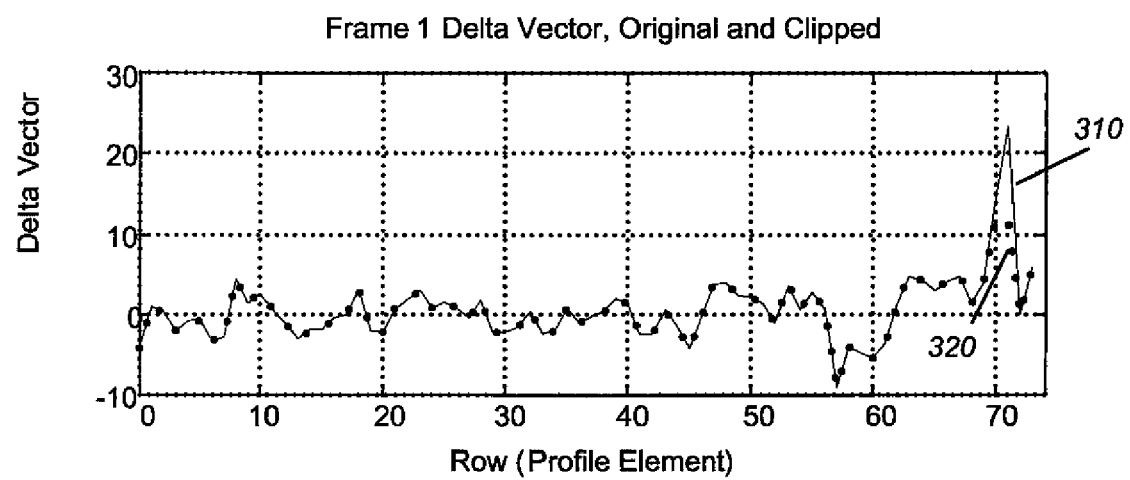
Figure 10C:
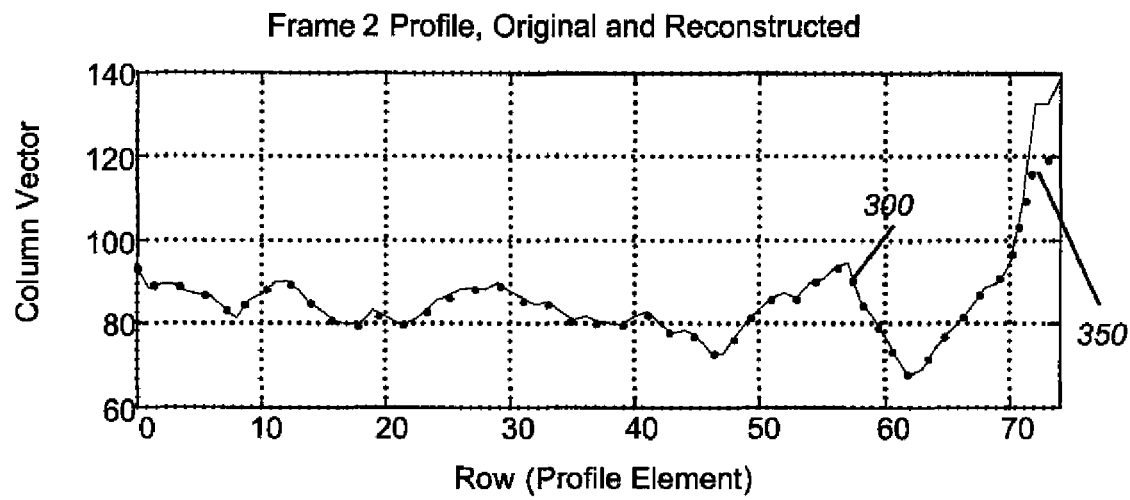
FIGS. 10C and 10D illustrate delta clipping of a column vector.
Figure 10D:
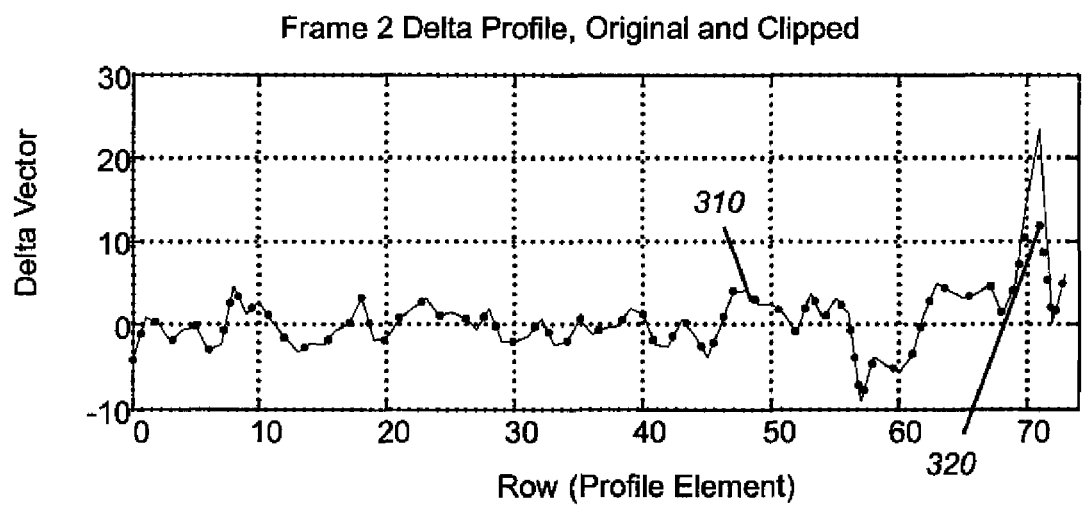
Figure 10E:
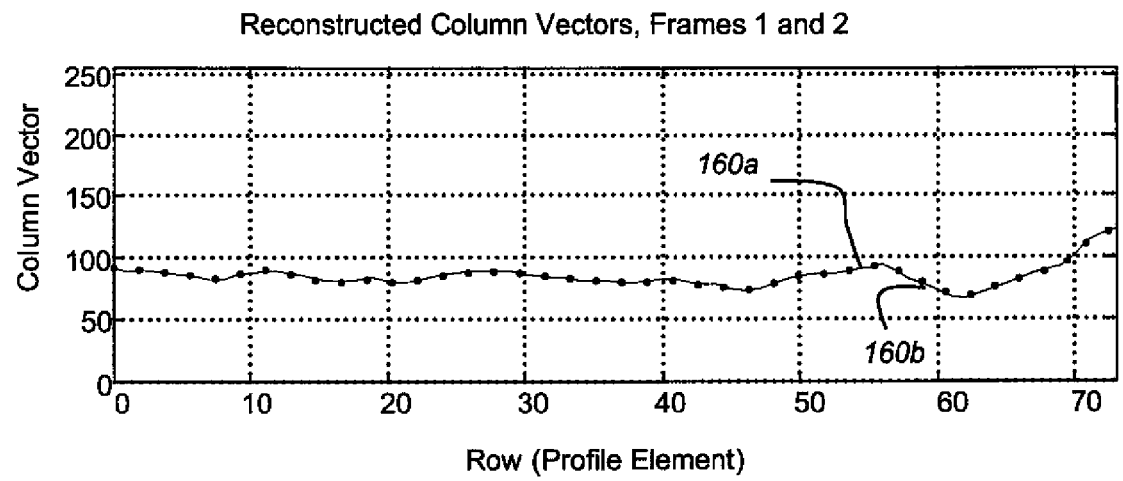
FIGS. 10E and 10F illustrate an exposure banding signal computed from frame differences.
Figure 10F:
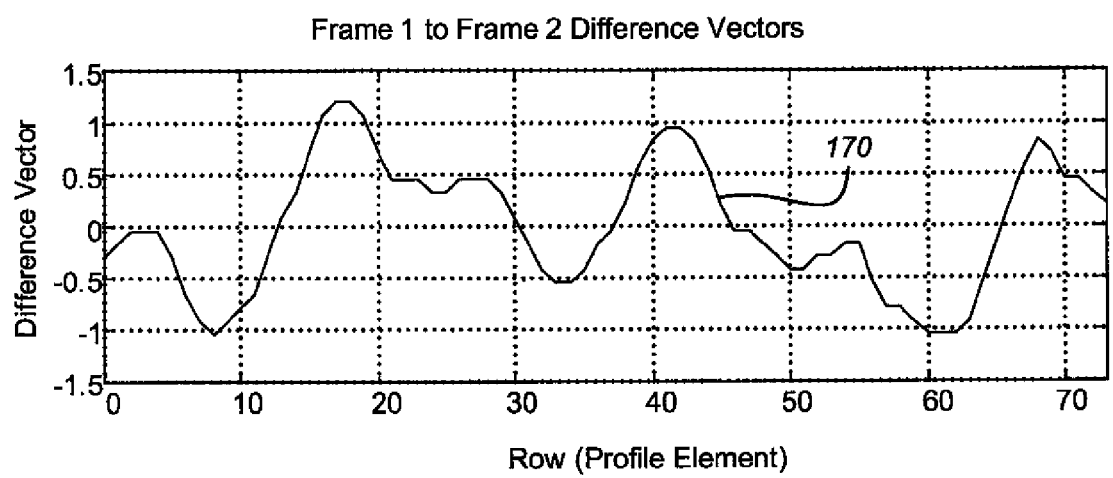

By way of contrast, FIGS. 10A through 10E, displayed in the same sequence used for the example of FIGS. 8A through 8E, show an example with much lower likelihood of illuminant flicker. Frame 1 processing is shown in FIGS. 10A and 10B. The curve labeled 300 in FIG. 10A shows the corresponding values in column vector 300. FIG. 10B plots the first order difference vector 310. Clipping, shown as a modified first order difference vector 320 in FIG. 10B, is again applied to reject sudden changes in the difference vector. Similar processing for Frame 2, the next frame in sequence, is given in FIGS. 10C and 10D. FIGS. 10E and 10F then show results for subtraction of modified column vectors 160a and 160b to yield difference vector 170, in similar manner as was described earlier with reference to the example of FIGS. 8E and 8F. In this example, very little flicker is perceptible.

Referring again to FIG. 9, in calculation step 152, a row time 178 that relates to the readout sequence and a temporal period 179 that relates to power line frequencies are used to compute a spatial flicker period. Row time 178 is the time delay from reading one row of the image sensor to reading the next row of the image sensor, such as $15.6 \times 10^{-6}$ seconds for a typical image sensor array. The temporal period is the duration of one period of expected illuminant flicker, such as ¹⁄₁₂₀ or ¹⁄₁₀₀ of a second. Row time 178 and temporal period 179 allow calculation of the expected illuminant flicker period in units of rows. The number of rows that are summed to calculate each element of the column vector is one factor that is used to scale the expected flicker period from image sensor rows to column vector elements.

With the expected flicker period in terms of column vector elements, one or more lag values are calculated. These lag values are the integer offsets used in the autocorrelation analysis used to detect flicker. The primary lag value of interest is the rounded value of the expected flicker period. If flicker is present, there is positive autocorrelation of the column difference vector at this lag. A second lag of interest is 1.5 times the expected flicker period, rounded to the nearest integer. If illuminant flicker is present, the autocorrelation at this lag should be negative. Because difference or delta clipping and column vector subtraction do an imperfect job of isolating illuminant flicker from other phenomena, checking autocorrelation at two or more lag values improves rejection of false flicker signals. Other lag values can be considered as well, providing incremental improvements in detection reliability at the expense of increased processing requirements.

Autocorrelation

Figure 11A:
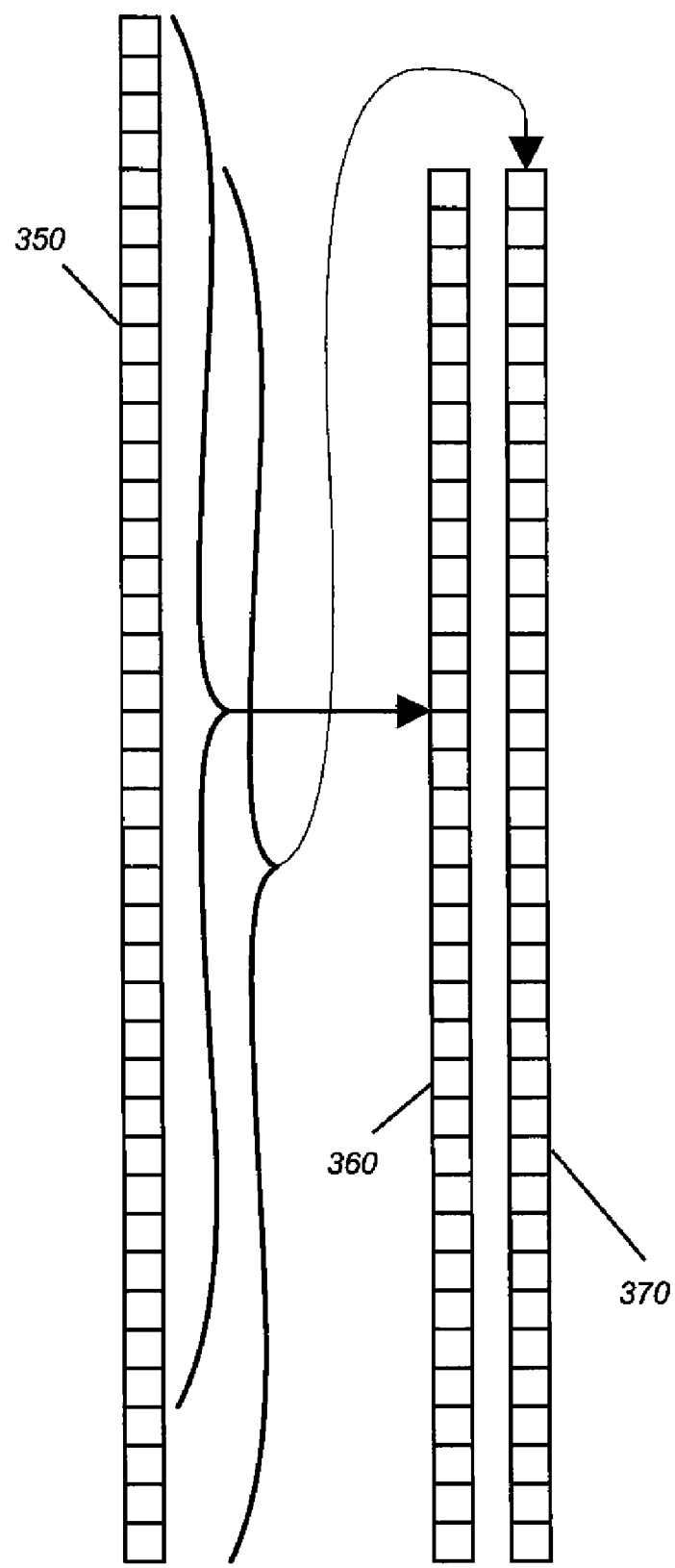
FIGS. 11A-C illustrate extraction of subset vectors for formation of autocorrelation dot products from a vector.

Still referring to FIG. 9, calculation step 154 calculates the autocorrelation of the refined column difference vector at the target lags determined in preceding calculation step 152. The autocorrelation process itself is illustrated in FIG. 11A. Autocorrelation processing takes the refined column difference vector 170 and extracts two subset vectors, 360 and 370. These two subset vectors are offset by a lag value. In FIG. 11A, first subset vector 360 begins four elements after second subset vector 370, so the lag is −4.

Figure 11B:
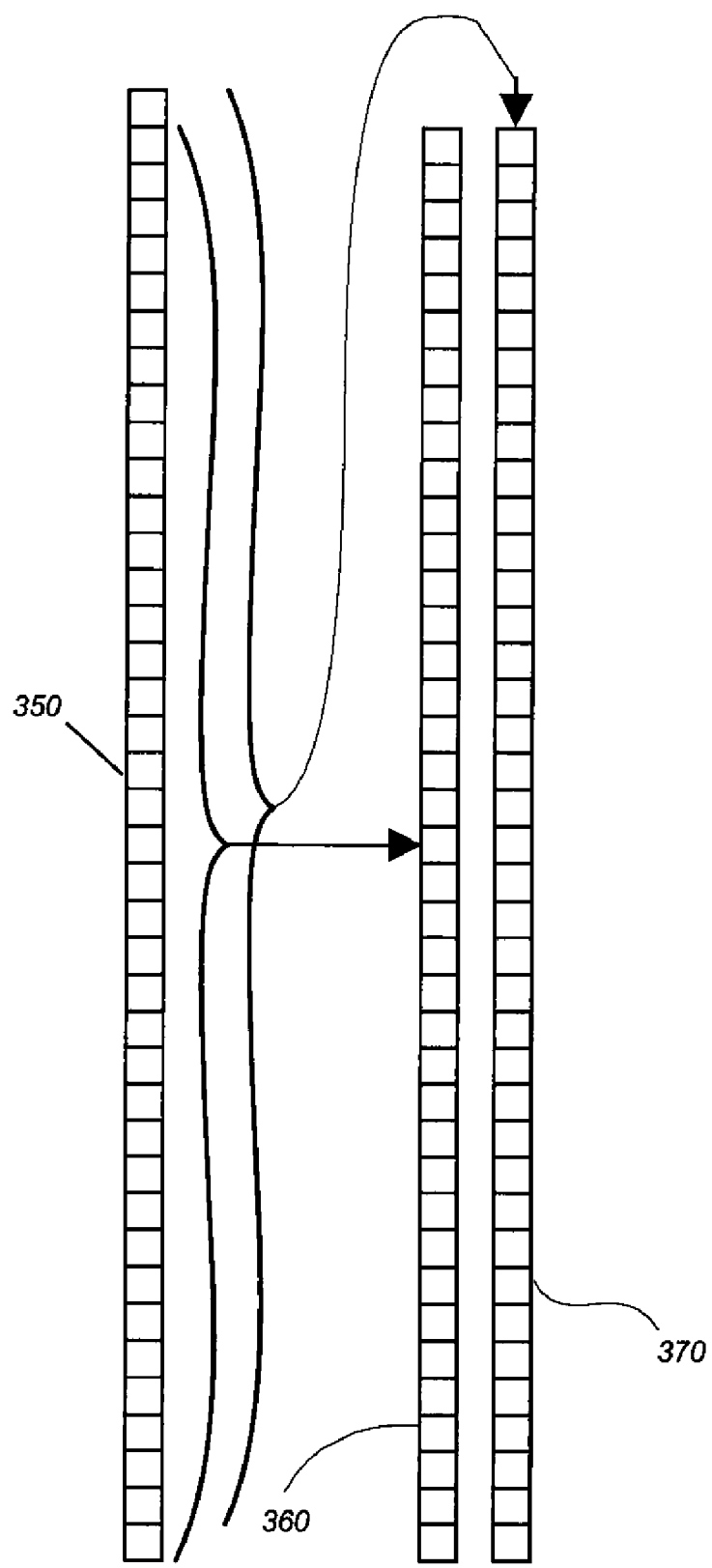
Figure 11C:
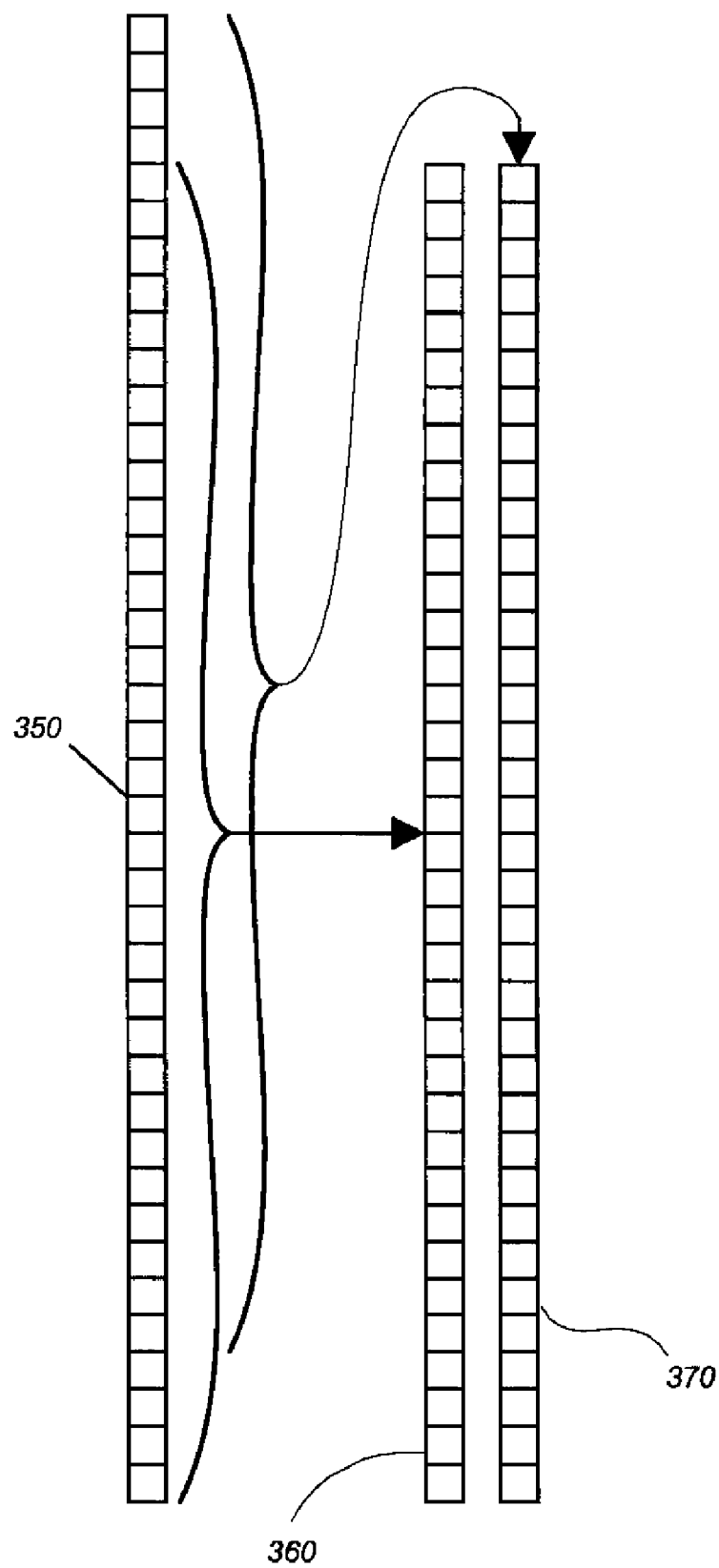

FIG. 11B illustrates the extraction of two subset vectors at another lag. Because first subset vector 360 begins one element before second subset vector 370, the lag illustrated is +1. Finally, FIG. 11C illustrates the case where first subset vector 360 begins 4 elements before second subset vector 370, yielding a lag of +4. The sign convention for the lag is arbitrary.

Once two subset vectors are extracted from the full column difference vector, the autocorrelation is calculated as follows. The first step is adjustment of each subset vector to make it zero-mean, according to equation (2) and (3):

$$\underline{z}_1 = \underline{s}_1 - \text{mean}(\underline{s}_1) \tag{2}$$

$$\underline{z}_2 = \underline{s}_2 - \text{mean}(\underline{s}_2) \tag{3}$$

In these equations, the first subset vector is $s_1$ and the second subset vector is $s_2$. The underbars signify that these are vectors. The mean function is the arithmetic mean. After removing any mean bias, the autocorrelation is calculated according to equation (4):

$$r = \frac{(\underline{z}_1 \cdot \underline{z}_2)}{\sqrt{(\underline{z}_1 \cdot \underline{z}_1)(\underline{z}_2 \cdot \underline{z}_2)}} \tag{4}$$

In equation (4), the · symbol refers to a standard vector dot product operation. Because the square root function is relatively expensive, the following embodiment is preferred. First, equation (5) is used to calculate a squared correlation coefficient:

$$C = \frac{(\underline{z}_1 \cdot \underline{z}_2)^2}{(\underline{z}_1 \cdot \underline{z}_1)(\underline{z}_2 \cdot \underline{z}_2)} \tag{5}$$

A simple conditional is used to bring back the sign of the correlation coefficient. If $(\underline{z}_1 \cdot \underline{z}_2) < 0$ then C is negated.

The correlation values are stored for the several lags, such as $C_E$ for the correlation at the expected lag and $C_{1.5}$ for the correlation at the longer lag. Once the correlations are calculated at several lags, they are combined in processing step to produce a binary decision whether flicker exposure bands are present. The preferred embodiment uses any of a number of tests to detect exposure banding due to illuminant flicker, including the following.

(i) A first test is whether $C_E$, the correlation at the expected lag is equal to the maximum of the several correlation values. If so, then $F_{max}$ is set.
(ii) A second test is whether the range of correlation values is above a threshold. If so, $F_{range}$ is set.
(iii) A third test is whether $C_E$, the correlation at the expected lag, is above a threshold. If so, $F_E$ is set.
(iv) A fourth test guards against spurious correlations with extremely small values in the column difference vector. In cases where the column difference vector is essentially zero, correlations can happen even when there is not significant exposure banding. The mean of the squares of the column difference vector is calculated as in equation (6)

$$M_s = \frac{1}{N} \sum_i (d_i)^2 \tag{6}$$

In this equation, $d_i$ refers to each element of the refined column difference vector 170. The variable i indexes through all the elements in the refined column difference vector, and the variable N is the number of elements in the refined column difference vector 170. If the mean of the squares $M_s$ is above a threshold, then $F_S$ is set.

Referring back to FIG. 9, in one embodiment, the output of calculation step 156 is the logical AND of the four test flags (i)-(iv) described above. Processing step 158 uses this autocorrelation information to determine which of several sets of exposure times are to be used for controlling exposure. For example, if an exposure time of 10 milliseconds is used for capturing the first and second images and flicker is detected, it would be determined that 120 Hz flicker is present. Accordingly, exposure will be restricted to integer multiples of 8.333 milliseconds. As exposure controller 40 determines the best combination of control parameters to provide a properly exposed image, it selects exposure times from this restricted set. Alternatively, an exposure of 8.333 milliseconds is used in capturing the first and second frames for flicker detection. In this case, if flicker is detected, exposure will be restricted to integer multiples of 10 milliseconds.

The preferred embodiment checks for flicker in both sets of exposure times. If flicker is not detected in either case, then an unrestricted set of exposure times is selected. After selecting the appropriate set of exposure time times, processing step 150 stores the current column vector as the previous column vector. Then, using the overall logic of FIG. 4, control is returned to processing step 100.

Processing Iterations

Running through the processing flow in FIG. 4 several times and combining the outputs to provide a more stable decision increases the reliability of flicker detection. The preferred embodiment uses four passes through the loop to balance the speed of a decision and reliability of the decision. Illuminant flicker rarely changes between 100 Hz and 120 Hz. Because of this, once flicker is detected, the decision about which kind of flicker is detected can be stored, to avoid having to continually check both illuminant frequencies.

For the example shown in FIGS. 10A-10F, the processing in calculation step 154 and detection step 156 (FIG. 9) determine that there are no significant exposure bands caused by illuminant flicker. Processing step 158 then selects the unrestricted set of exposure times. Finally, processing step 150 stores the current modified column vector as the previous modified column vector, and returns to processing step 100.

It will be apparent to one skilled in the art that this process detects exposure bands that move from one frame to the next. If the time interval from one frame to the next frame is an integer multiple of the illuminant flicker period, the column difference vector will not show exposure bands. This shortcoming can be treated in several ways. In cases where the frame rate is not quite a multiple of the illuminant flicker period, using more frames for the analysis can improve detection. This can take the form of skipping one or more frames, as taught in U.S. Pat. No. 7,142,234. Another approach is to adjust the frame rate, so it is not an integer multiple of the illuminant flicker period, as taught in U.S. Pat. No. 7,187,405.

Figure 2B:
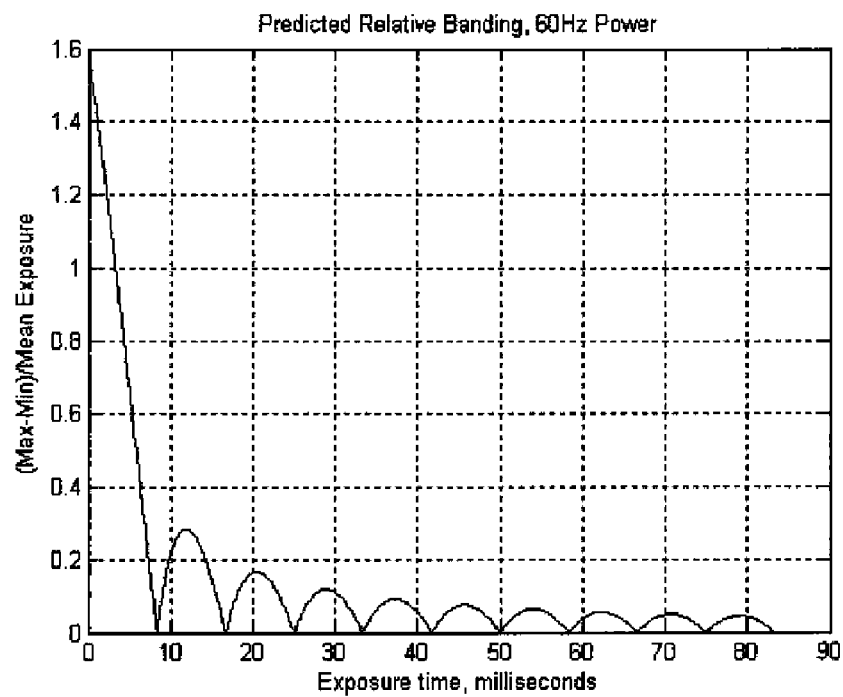
FIG. 2B is a graph relating relative banding to exposure time for 60 Hz illumination.
Figure 2C:
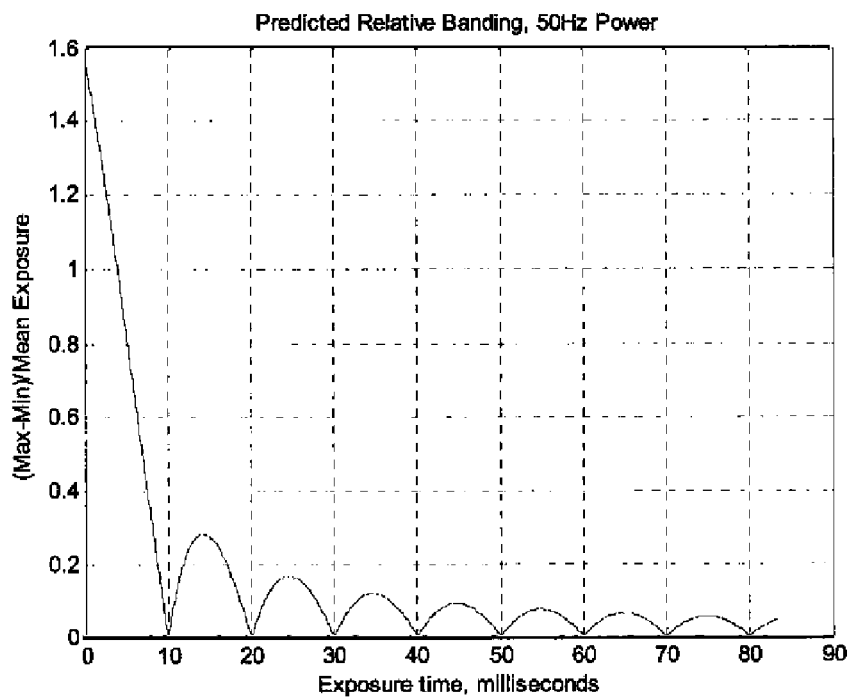
FIG. 2C is a graph relating relative banding to exposure time for 50 Hz illumination.

As illustrated in FIGS. 2B and 2C, the magnitude of flicker-induced banding diminishes as exposure time increases. Thus, acquiring several frames at shorter exposure times will make flicker easier to detect, even if a longer exposure time is subsequently chosen to provide the best overall image quality.

Alternate Embodiments

Figure 12:
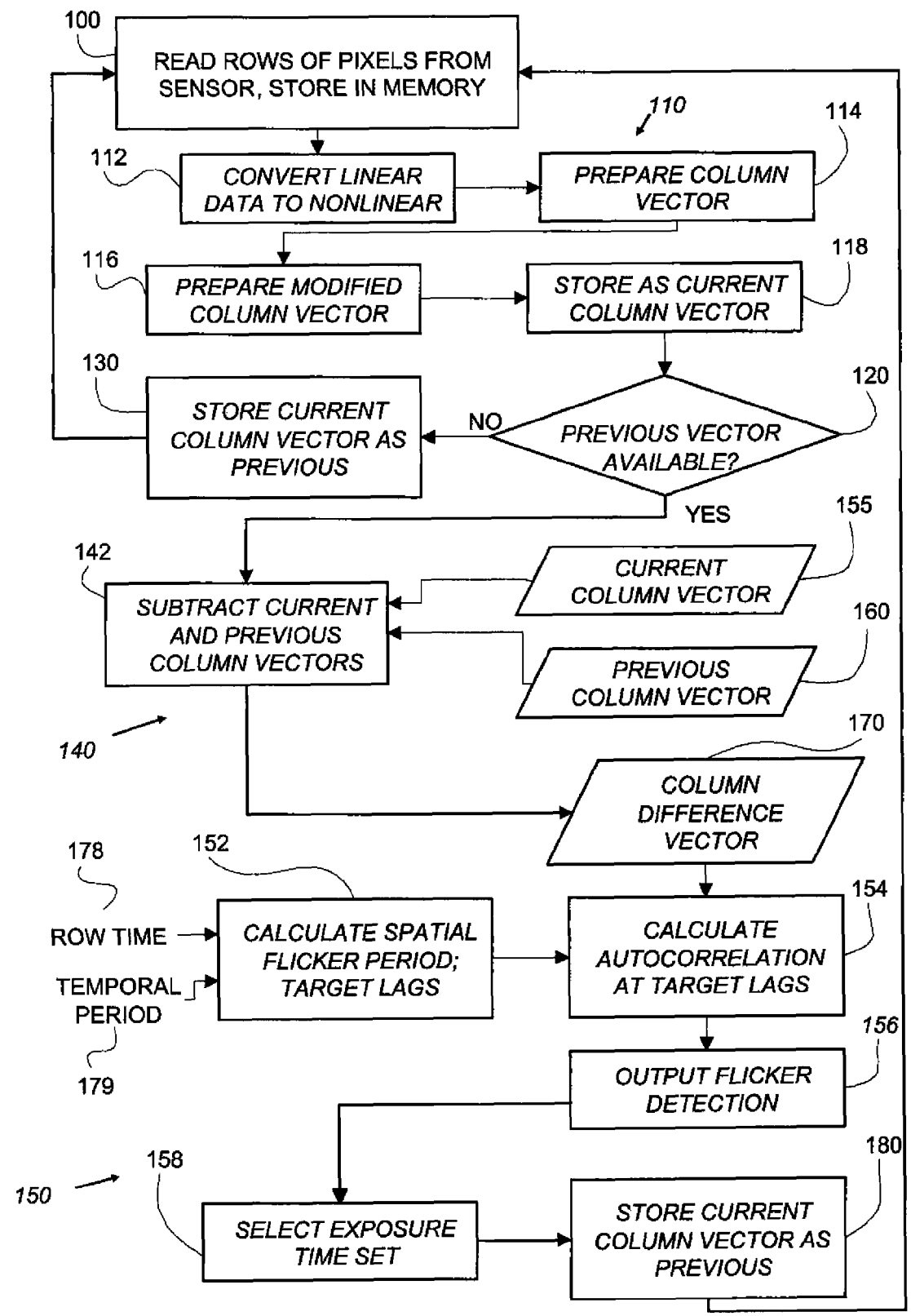
FIG. 12 is a flow diagram of a second embodiment of the present invention.

The overall sequence of processing shown earlier and described with particular reference to FIGS. 4 and 9 admits a number of different embodiments. Referring first, to the logic flow diagram of FIG. 12, there is shown a processing sequence wherein processing step 110 has a number of substeps. In a conversion step 112, linear data is converted to non-linear data, such as log data, in order to provide the advantages noted earlier with particular reference to FIGS. 5 and 6. This reduces the impact of scene content changes between two column vectors. Subsequent preparation steps 114 and 116 then prepare column vectors and modified column vectors accordingly. A storage step 118 then temporarily stores the newly prepared modified column vector, generated using processing steps described earlier with reference to FIGS. 8A-8E and 10A-10E. When current and previous column vectors 155 and 160 are available, subtraction step 142 then generates column difference vector 170, using processing steps described earlier with reference to the examples in FIGS. 8F and 10F. The rest of the processing steps in the embodiment of FIG. 12 are as previously described with reference to FIG. 9. A storage step 180 then stores the current column vector at the conclusion of processing.

Figure 13:
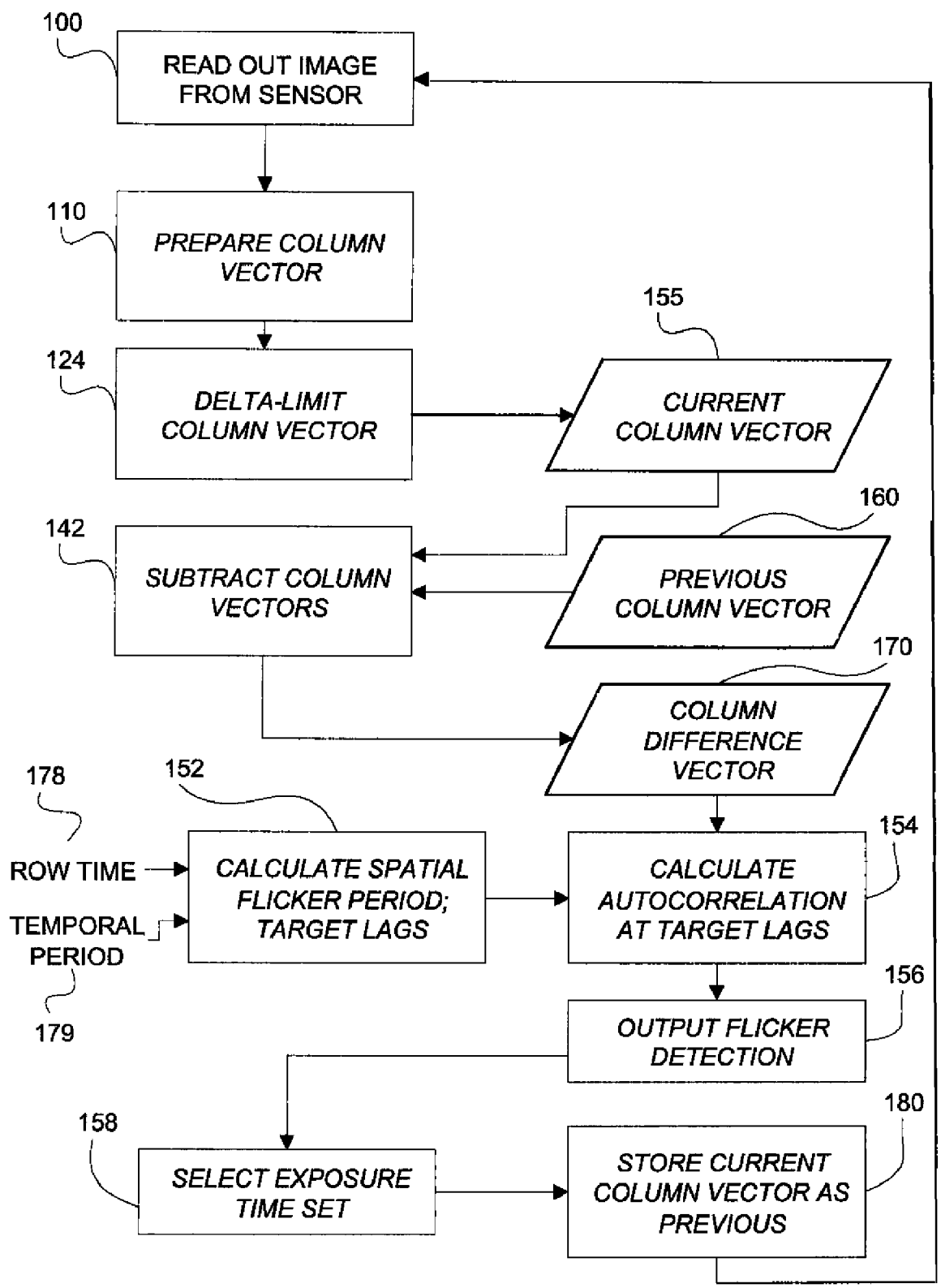
FIG. 13 is a flow diagram of a third embodiment of the present invention.

The logic flow diagram of FIG. 13 uses the same general sequence as that described with reference to FIG. 12, but without conversion step 112. A clipping step 124 is also provided, to perform delta-limiting or difference-limiting as described earlier with reference to FIGS. 8B, 8D, 10B, and 10D.

Figure 14:
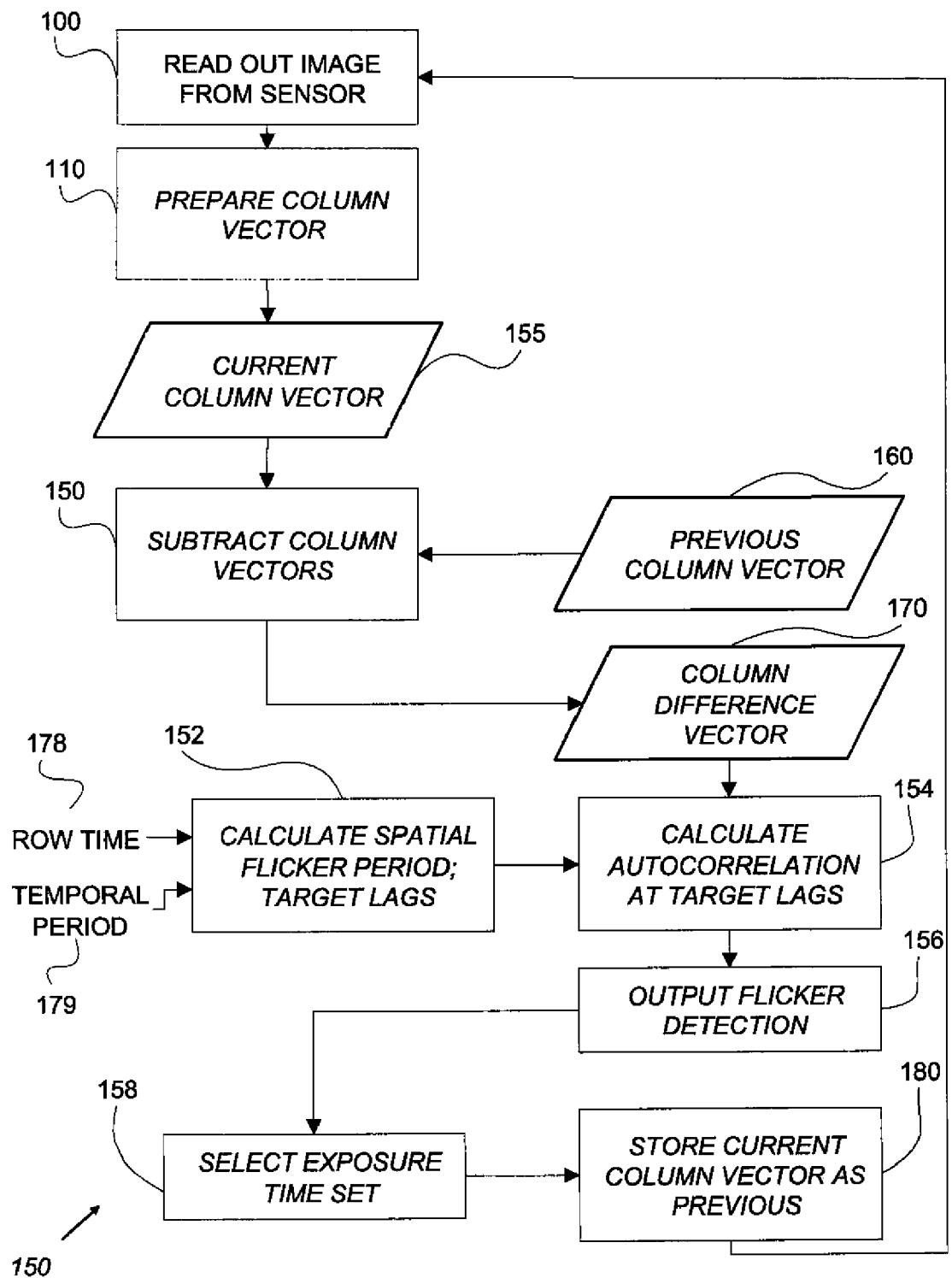
FIG. 14 is a flow diagram of a fourth embodiment of the present invention.

The logic flow diagram of FIG. 14 shows another embodiment, not using nonlinear conversion step 112 or difference clipping step 124, but still using autocorrelation in calculation step 154.

Figure 15:
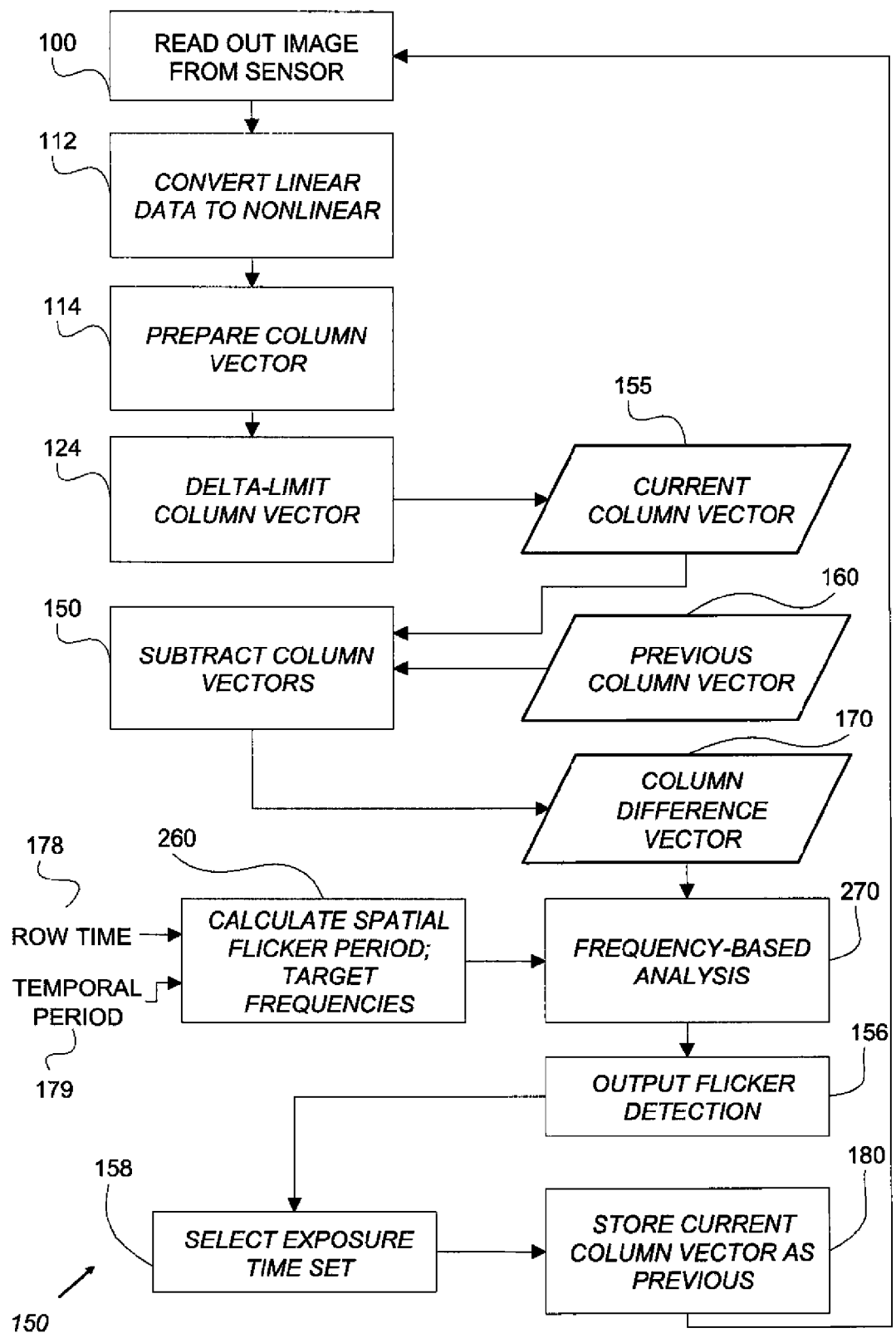
FIG. 15 is a flow diagram of a fourth embodiment of the present invention.

The logic flow diagram of FIG. 15 shows another embodiment that uses conversion step 112 along with clipping step 124. Here, processing step 260 takes the row time 178 and the temporal period 179, and calculates the spatial flicker period in the column vector, then converts that to a spatial frequency. This frequency and perhaps others are passed on to processing step 270, frequency-based analysis. Processing step 270 performs frequency-based analysis, such as a Discrete Fourier transform (DFT), bandwidth filtering, or cross-correlation between the difference vector and sinusoidal basis functions. The results of this frequency-based analysis are output to detection step 156, which then provides results of output flicker detection to a processing step 158 that selects the set of available exposure times.

One skilled in the art can see that the multiple components of this invention: a log-like conversion, delta limiting of a column vector, and auto-correlation analysis, all bring improvement to the art of flicker detection. The preferred embodiment uses all of these techniques, but they can also be practiced in different combinations with other techniques known in the art.

These embodiments have specifically illustrated processing from CFA patterns using R, G, and B pixels in a Bayer color pattern. The same processing paths can also be used with other color patterns (or no color patterns in the case of a monochrome sensor) with only minor alterations (such as different row grouping in preparation of the column vector). For clarity, these embodiments are described without specific reference to the details of memory management. This invention can be practiced with a variety of memory and buffer management approaches.

The invention has been described in detail with particular reference to certain preferred embodiments thereof, but it will be understood that variations and modifications are effected within the spirit and scope of the invention.

PARTS LIST 12 light from subject scene
13 lens
14 neutral density filter
15 iris
16 brightness sensor
18 imaging stage
20 image sensor
22 analog signal processor
24 analog to digital (A/D) converter
26 timing generator
28 image sensor stage
30 digital signal processor (DSP) bus
32 digital signal processor (DSP) memory
36 digital signal processor (DSP)
38 controller
40 exposure controller
50 system controller
52 system controller bus
54 program memory
56 system memory
57 host interface
60 memory card interface
62 memory card socket
64 memory card
70 viewfinder display
72 exposure display
74 user inputs
76 status display
80 video encoder
82 display controller
88 image display
100 read step
110 processing step
112 conversion step
114 preparation step
116 preparation step
118 storage step
120 decision step
124 clipping step
130 storage step
140 computation step
142 subtraction step
150 exposure computation step
152 calculation step
154 calculation step
155 current column vector
156 detection step
158 processing step
160 previous column vector
160a, 160b modified column vector
170 refined column difference vector
178 row time
179 temporal period
180 storage step
230 log-like nonlinear transform
250 log-like nonlinear transform
235 curve of difference from log-like nonlinear transform 230

255 curve of difference from log-like nonlinear transform 250
260 processing step
270 processing step
300 column vector
302 filter
310 first order difference vector
320 modified first order difference vector curve
350 modified column vector
360 subset vector for auto-correlation
370 subset vector for auto-correlation
400 image capture device
610 two-dimensional pixel array
612 row reset pointer
614 row readout pointer
616 curve of temporal illumination variation from a flickering illuminant
618 short duration exposure time window
620 curve illustrating exposure bands with short exposure time
622 single cycle duration exposure time window
624 curve illustrating no exposure bands with single cycle exposure time
626 long duration exposure time window
628 curve illustrating exposure bands with long exposure time

The invention claimed is:

1. A method of determining when an image capture device with a rolling shutter is in an environment having a flickering illuminant, comprising:
   (a) storing rows of pixels from a first captured digital image in a memory;
   (b) using the rows of pixels of the first capture digital image to provide a first column vector;
   (c) providing a first-order difference vector from the first column vector; and clipping the elements in the first-order difference vector of the first column vector and reconstructing those clipped elements into a first modified column vector;
   (d) storing rows of pixels from a second captured digital image in the memory;
   (e) using the rows of pixels of the second captured digital image to provide a second column vector;
   (f) providing a first-order difference vector from the second column vector; and clipping the elements in the first-order difference vector of the second column vector and reconstructing those clipped elements into a second modified column vector;
   (g) subtracting the first modified column vector from the second modified column vector to provide a refined difference vector; and
   (h) computing autocorrelations of the refined difference vector at specified lag(s) and using the autocorrelations to determine when the image capture device with the rolling shutter is in an environment having a flickering illuminant.

2. The method of claim 1 further including adjusting the image capture device to change the exposure time when flicker has been determined.

3. The method of claim 1 wherein lag of step (f) is for 100 Hz or 120 Hz.

4. A method of determining when an image capture device with a rolling shutter is in an environment having a flickering illuminant, comprising:
   (a) storing rows of pixels from a first captured digital image in a memory;
   (b) converting each pixel of each row of the first capture digital image into a logarithmic digital representation providing a first converted digital image and using the rows of the first converted digital image to provide a first column vector;
   (c) providing a first-order difference vector from the first column vector; and clipping the elements in the first-order difference vector of the first column vector and reconstructing those clipped elements into a first modified column vector;
   (d) storing rows of pixels from a second captured digital image in the memory;
   (e) converting each pixel of each row of the second captured digital image into a logarithmic digital representation providing a second converted digital image and using the rows of the second converted digital image to provide a second column vector;
   (f) providing a first-order difference vector from the second column vector; and clipping the elements in the first-order difference vector of the second column vector and reconstructing those clipped elements into a second modified column vector;
   (g) subtracting the first modified column vector from the second modified column vector to provide a refined difference vector; and
   (h) computing autocorrelations of the refined difference vector at specified lag(s) and using the autocorrelations to determine when the image capture device with the rolling shutter is in an environment having a flickering illuminant.

5. The method of claim 4 further including adjusting the image capture device to change the exposure time when flicker has been determined.

6. The method of claim 4 wherein lag of step (f) is for 100 Hz or 120 Hz.

7. A method of determining when an image capture device with a rolling shutter is in an environment having a flickering illuminant, comprising:
   (a) storing rows of pixels from a first captured digital image in a memory;
   (b) converting each pixel of each row of the first capture digital image into a logarithmic digital representation providing a first converted digital image and using the rows of the first converted digital image to provide a first column vector;
   (c) providing a first-order difference vector from the first column vector; and clipping the elements in the first-order difference vector of the first column vector and reconstructing those clipped elements into a first modified column vector;
   (d) storing rows of pixels from a second captured digital image in the memory;
   (e) converting each pixel of each row of the second captured digital image into a logarithmic digital representation providing a second converted digital image and using the rows of the second converted digital image to provide a second column vector;
   (f) providing a first-order difference vector from the second column vector; and
   clipping the elements in the first-order difference vector of the second column vector and reconstructing those clipped elements into a second modified column vector;

(g) subtracting the first modified column vector from the second modified column vector to provide a refined difference vector; and
(h) computing using frequency analysis on the refined difference vector to determine when the image capture device with the rolling shutter is in an environment having a flickering illuminant.

8. The method of claim 7 further including adjusting the image capture device to change the exposure time when flicker has been determined.

9. The method of claim 7 wherein the frequency analysis of step (f) is at a frequency for 100 Hz or 120 Hz.

* * * * *